(12) United States Patent
Zerweckh et al.

(10) Patent No.: US 9,567,056 B2
(45) Date of Patent: Feb. 14, 2017

(54) DEVICES, SYSTEMS AND METHODS FOR PASSIVE CONTROL OF FLOW

(71) Applicant: General Atomics Aeronautical Systems, Inc., Poway, CA (US)

(72) Inventors: Siegfried Hermann Zerweckh, Berkeley, CA (US); Michael Rudolf Ruith, San Diego, CA (US); Steven James Ruther, San Diego, CA (US); Pritesh Chetan Mody, San Diego, CA (US)

(73) Assignee: GENERAL ATOMICS AERONAUTICAL SYSTEMS, INC., Poway, CA (US)

( * ) Notice: Subject to any disclaimer, the term of this patent is extended or adjusted under 35 U.S.C. 154(b) by 283 days.

(21) Appl. No.: 14/199,899

(22) Filed: Mar. 6, 2014

(65) Prior Publication Data
US 2015/0251745 A1 Sep. 10, 2015

(51) Int. Cl.
*F15B 21/00* (2006.01)
*B64C 21/00* (2006.01)
*B64C 1/00* (2006.01)
*B64C 7/00* (2006.01)
*B64D 43/00* (2006.01)
*F15D 1/00* (2006.01)
(Continued)

(52) U.S. Cl.
CPC ............... *B64C 1/0009* (2013.01); *B64C 7/00* (2013.01); *B64C 21/00* (2013.01); *B64C 23/06* (2013.01); *B64D 43/00* (2013.01); *F15D 1/003* (2013.01); *F15D 1/0085* (2013.01); *F15D 1/12* (2013.01); *Y02T 50/162* (2013.01); *Y10T 137/2082* (2015.04); *Y10T 137/2224* (2015.04)

(58) Field of Classification Search
CPC .......... B64C 1/0009; B64C 7/00; B64C 21/00; B64C 23/06; B64D 43/00; F15D 1/003; F15D 1/0085; F15D 1/12; Y10T 137/2082; Y10T 137/2224; Y02T 50/162
USPC ..... 137/807, 833; 244/129.4, 3.16, 35 R, 39, 244/132
See application file for complete search history.

(56) References Cited

U.S. PATENT DOCUMENTS 3,693,913 A * 9/1972 Barland, Sr. .............. B64C 7/00
244/130
3,940,097 A 2/1976 Wilson et al.
(Continued)

FOREIGN PATENT DOCUMENTS

FR 2898192 A1 * 9/2007 ............... G02B 7/22
FR 2898192 A1 9/2007

OTHER PUBLICATIONS

Extended European search report in European Patent Application No. 15157780.6, dated Sep. 4, 2015.

*Primary Examiner* — Craig Schneider
*Assistant Examiner* — Minh Le
(74) *Attorney, Agent, or Firm* — Knobbe, Martens, Olson & Bear LLP

(57) ABSTRACT

Systems, devices and methods are disclosed for controlling the flow of a fluid over the window of an optical instrument housing in a freestream flow field. For example, the flow upstream of the housing may be split to create a flow region over the window that is conducive to successful operation of the instrument. The flow region may be maintained for various rotations of the housing about yaw, pitch, and roll axes. The disclosed features in some embodiments induce flow regions with reduced spatial and temporal density gradients of the flow over the window.

30 Claims, 14 Drawing Sheets

(51) Int. Cl.
*F15D 1/12* (2006.01)
*B64C 23/06* (2006.01)

(56) References Cited

U.S. PATENT DOCUMENTS

| | | | | |
|---|---|---|---|---|
| 3,974,985 A * | 8/1976 | Campbell | ............. | F41G 7/2213 |
| | | | | 244/3.16 |
| 4,677,288 A * | 6/1987 | Smith | ................. | F41G 3/326 |
| | | | | 244/3.16 |
| 4,881,772 A * | 11/1989 | Feinberg | ............. | B62D 35/007 |
| | | | | 296/180.1 |
| 5,069,397 A * | 12/1991 | Haslund | .................. | B64C 21/04 |
| | | | | 244/1 R |
| 5,775,643 A | 7/1998 | McMaster et al. | | |
| 5,806,789 A | 9/1998 | Boulware et al. | | |
| 6,471,157 B1 * | 10/2002 | Streett | ..................... | B64C 23/06 |
| | | | | 244/1 N |
| 7,547,865 B2 * | 6/2009 | Johnson | ................ | F41G 7/2253 |
| | | | | 244/117 R |
| 7,661,890 B2 * | 2/2010 | Basho | ..................... | G03B 27/58 |
| | | | | 348/143 |
| 7,815,150 B2 * | 10/2010 | Vassberg | ................. | B64C 23/00 |
| | | | | 244/199.1 |
| 8,212,709 B2 * | 7/2012 | Bradley | .................. | F41G 7/224 |
| | | | | 244/3.1 |
| 8,376,280 B1 | 2/2013 | Gendron et al. | | |
| 8,635,938 B2 * | 1/2014 | King | ..................... | F41H 13/005 |
| | | | | 244/130 |
| 8,654,314 B2 * | 2/2014 | King | ..................... | F41H 13/005 |
| | | | | 250/201.6 |
| 8,870,122 B2 * | 10/2014 | Ullman | ..................... | B64C 7/00 |
| | | | | 244/130 |
| 8,870,275 B1 * | 10/2014 | Schmidt | ................. | B62D 35/001 |
| | | | | 244/209 |
| 9,126,546 B2 * | 9/2015 | Bochenek | ................ | B60R 11/04 |
| 2009/0242702 A1 | 10/2009 | Cain et al. | | |
| 2010/0258046 A1 * | 10/2010 | Berger | ..................... | B63B 1/38 |
| | | | | 114/274 |
| 2012/0162428 A1 * | 6/2012 | Wee | ..................... | B60R 1/0602 |
| | | | | 348/148 |
| 2012/0242833 A1 * | 9/2012 | Yamaguchi | .......... | B62D 35/007 |
| | | | | 348/148 |

* cited by examiner

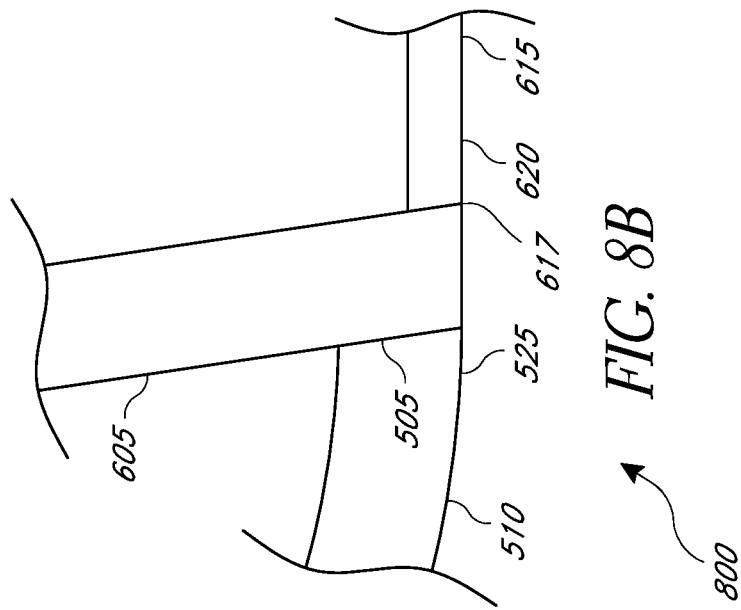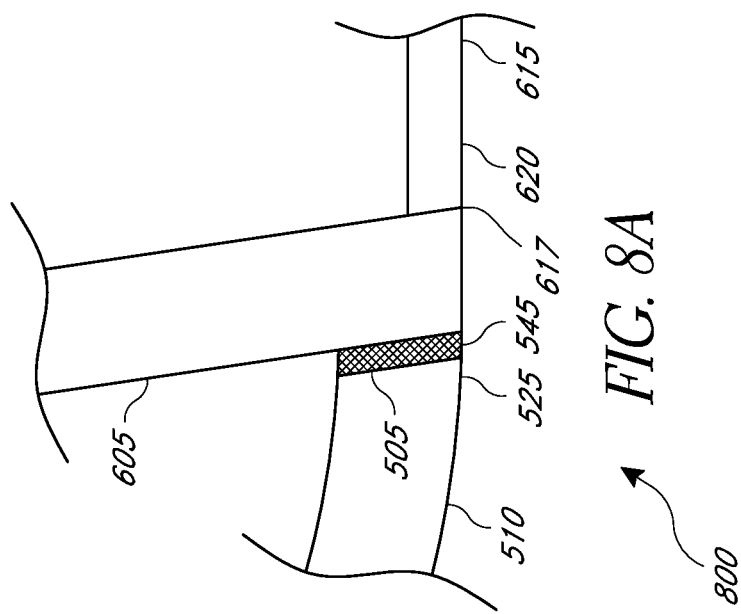

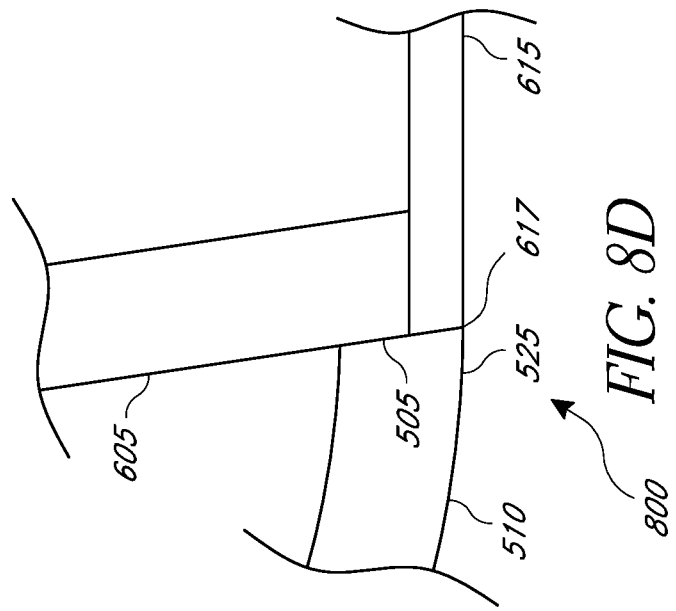
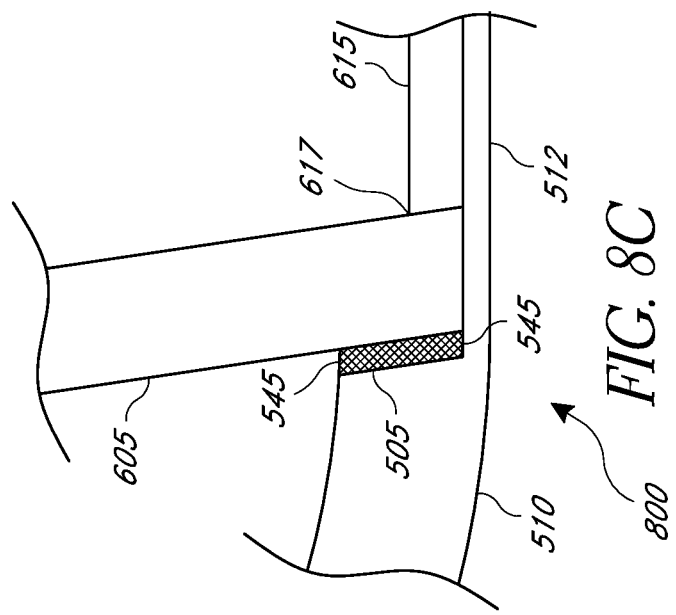

DEVICES, SYSTEMS AND METHODS FOR PASSIVE CONTROL OF FLOW

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field of the Invention

This disclosure relates generally to the field of instrumentation in freestream flow fields. In particular, features for improving the flow over an optical instrument in a freestream flow field are disclosed.

Description of the Related Art

Aberrations in electromagnetic energy induced by unfavorable fluid flow are a serious concern in systems that operate in flow fields. For instance, in some airborne communication and imaging systems, an optical beam is required to be transmitted through a relatively long distance, over which the quality of the beam can degrade due to variations of the index of refraction along its path. For air and many fluids, the refractive index is linearly related to the density of the fluid through the Gladstone-Dale relation, and therefore density fluctuations, such as in turbulent flow, are the root cause of these aberrations.

An electromagnetic beam in a flow field generally encounters flow in the vicinity of the instrument that is detrimental to successful operation of the instrument. For instance, turbulent flow in the vicinity of an aperture of an instrument may be produced by the presence of solid boundaries. These near-field flows typically involve turbulent boundary layers, mixing layers, and wakes. When an initially planar electromagnetic wavefront, such as an optical wavefront, passes through a flow field, different parts of the wavefront experience different densities in the medium and hence have different propagation speeds. Consequently the wavefront becomes deformed. A small initial deformation of the wavefront can lead to large errors on a distant target. The consequences of such deformations include beam deflection (bore-sight error) and jitter, beam spread, and loss of intensity. Wavefront distortions can also cause reductions of resolution, contrast, effective range, and/or sensitivity for airborne electro-optical sensors and imaging systems.

Conventional solutions addressing the problems due to such unfavorable near-field flow have included openings or channels through the vehicle or structure housing an instrument. Other approaches have involved actively influencing the flow with jets of fluid injected into the flow. Still other approaches have involved flow detection and responsive beam correction. However, these approaches are invasive, require complex sensors and systems, and/or necessitate alterations to the structure of the vehicle containing the housing. Further, these approaches limit the utility of the instruments. For instance, the orientations of the instrument with respect to the freestream flow, for which the instrument will successfully operate, are limited. As an example, approaches that employ active control with static jets of fluid limit the viewing angles of the instrument because the flow from the jets is at a different angle relative to the flow over the instrument after the instrument has rotated. While the jets themselves may move to compensate for the moving instrument, this introduces even further complexity and cost.

It is therefore desirable to address the problems associated with near-field flow over an electromagnetic instrument in a more convenient, economical, and less complex manner.

SUMMARY

The embodiments disclosed herein each have several aspects no single one of which is solely responsible for the disclosure's desirable attributes. Without limiting the scope of this disclosure, its more prominent features will now be briefly discussed. After considering this discussion, and particularly after reading the section entitled "Detailed Description" one will understand how the features of the embodiments described herein provide advantages over existing approaches to flow control.

Several embodiments are disclosed for an apparatus for controlling fluid flow over a window of a moveable optical instrument housing, the housing comprising a perimeter and at least partially protruding from a vehicle into a freestream flow field. The apparatus may comprise an inner perimeter configured to complement the perimeter of the housing, an arcuate top surface comprising a curvature and configured to extend into an upstream portion of the freestream flow field, and an arcuate outer perimeter coupled to the arcuate top surface. The apparatus is configured to couple with the housing and to split the freestream flow field into a first flow field that is at least partially above the apparatus and window and a second flow field that is at least partially under the apparatus and around the housing. The first flow field comprises an aero-optical flow region that extends at least partially over the arcuate top surface and continues at least partially over the window, and the aero-optical flow region is maintained within a range of angular orientations of the apparatus relative to the freestream flow.

In some embodiments, an inner portion of the arcuate top surface is configured to be substantially flush with an outer portion of the window when the apparatus is coupled with the housing. The inner portion of the arcuate top surface may also be configured to be substantially contiguous with an outer portion of the window when the apparatus is coupled with the housing. Further, a slope of the inner portion of the arcuate top surface may be configured to substantially match a slope of the outer portion of the window, with the outer portion of the window adjacent to the inner portion of the arcuate top surface.

In some embodiments, the apparatus is configured such that a boundary layer in the first flow field over the inner portion comprises a velocity profile substantially similar to a downstream velocity profile of the boundary layer over an outer portion of the window. The outer portion of the window may be adjacent to the inner portion of the arcuate top surface.

In some embodiments, the inner perimeter is substantially impermeable to the freestream flow field, the first flow field and the second flow field. The inner perimeter may further comprise a seal that is substantially impermeable to the freestream flow field, the first flow field and the second flow field.

The arcuate outer perimeter may be rounded and it may comprise a radius. The arcuate top surface and the outer perimeter may form a substantially smooth surface. In some embodiments, the curvature curves toward the second flow field.

In some embodiments, the apparatus further comprises a bottom surface, wherein the bottom surface and the arcuate top surface define a thickness therein. The thickness may be substantially uniform or substantially nonuniform.

In some embodiments, the inner perimeter, the arcuate top surface, the outer perimeter and the bottom surface form a plurality of cross sections of the apparatus. At least one of the cross sections may be configured to arcuately extend at least partially around the perimeter of the window, wherein at least one of the cross sections is configured to extend at least partially toward the freestream flow field. In some embodiments, at least one of the cross sections may be in a plane such that at least part of the freestream flow field in the plane is perpendicular to a line that is tangent to a point on an edge of the cross section. At least one of the cross sections may be configured to extend at least 180 degrees around the perimeter of the window.

In some embodiments, the optical instrument housing is moveable in at least two dimensions. The housing may be rotatable about a pitch axis and a yaw axis. The aero-optical flow region may be maintained for full angular rotations about the pitch, roll and yaw axes, including angular rotations of +/−180 degrees about each axis. In some embodiments, a Strehl ratio in the aero-optical flow region is at least 0.7 for electromagnetic radiation consisting of a wavelength of about 1 micrometer.

Further, the optical instrument housing may be substantially spherical and the window may be substantially planar. The optical instrument housing may comprise a turret housing on the vehicle, wherein the vehicle is an aircraft. In some embodiments, the apparatus is coupled to the turret housing.

Several embodiments are disclosed for a method for controlling fluid flow over the window of an optical instrument housing on a vehicle in a freestream flow field. The method may comprise splitting an upstream portion of the freestream flow field into a first flow field comprising an aero-optical flow region and a second flow field using an apparatus comprising an inner perimeter configured to complement a perimeter of the housing, an arcuate top surface comprising a curvature and configured to extend into the upstream portion of the freestream flow field, and an arcuate outer perimeter coupled to the arcuate top surface. The apparatus may be configured to couple with the housing, the aero-optical flow region may extend at least partially over the top surface and continue at least partially over the window, and the aero-optical flow region may be maintained over a range of angular orientations of the apparatus relative to the freestream flow.

In some embodiments, the method further comprises coupling the apparatus to the housing. Further, a substantially contiguous surface may be formed with an inner portion of the top surface and the perimeter of the housing. In some embodiments, the method further comprises matching the slope of an outer portion of the housing with the inner portion of the top surface, wherein the outer portion of the housing is adjacent to the inner portion of the top surface.

Several embodiments are also disclosed of a system for controlling fluid flow over a window of a moveable optical instrument housing that protrudes from a vehicle into a freestream flow field. In some embodiments, the system comprises a housing defining an axis and an arcuate lip comprising a curved top surface and outwardly extending away from the axis. The lip may be configured to split the freestream flow field into a first flow field above the lip and window and a second flow field under the lip and around the housing. The first flow field may comprise an aero-optical flow region that extends at least partially over the top surface of the lip and continues at least partially over the window, and the aero-optical flow region may be maintained over a range of angular orientations of the axis relative to the freestream flow.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

FIGS. 8A-8D depict various embodiments of an interface between the apparatus and housing of FIG. 1.

DETAILED DESCRIPTION

The following detailed description is directed to certain specific embodiments of the development. In this description, reference is made to the drawings wherein like parts or steps may be designated with like numerals throughout for clarity. Reference in this specification to "one embodiment," "an embodiment," or "in some embodiments" means that a particular feature, structure, or characteristic described in connection with the embodiment is included in at least one embodiment of the invention. The appearances of the phrases "one embodiment," "an embodiment," or "in some embodiments" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not others.

Some embodiments disclosed herein relate generally to systems, devices and methods of passively controlling the near-field flow over a window of an instrument housing in a flow field. The flow is controlled so that the near-field flow is more conducive to successful operation of the instrument. The flow upstream of the instrument may be split into separate domains by a device coupled with the housing. The device may interrupt the upstream flow and induce an "aero-optical" flow region, i.e. a flow region with reduced density gradients, over the window. Aberrations in the electromagnetic energy transmitted from or received by the instrument, which would be caused by distortions in the near-field flow over the housing without the device, may be mitigated. An aero-optical flow region over the window may further be induced for various orientations of the device with respect to the freestream flow field.

Some terms or phrases used herein may be unfamiliar to the reader. Therefore, descriptions of these terms will be given. The following descriptions of certain terms are meant to assist with understanding the present disclosure. The descriptions are not meant to limit the disclosure but rather clarify the meaning of these terms as they are used herein. Any examples given are merely illustrative and are not meant to limit the scope of the present disclosure. These descriptions will apply to the terms as used throughout the disclosure, unless the context in which they are used indicates otherwise.

Figure 1:
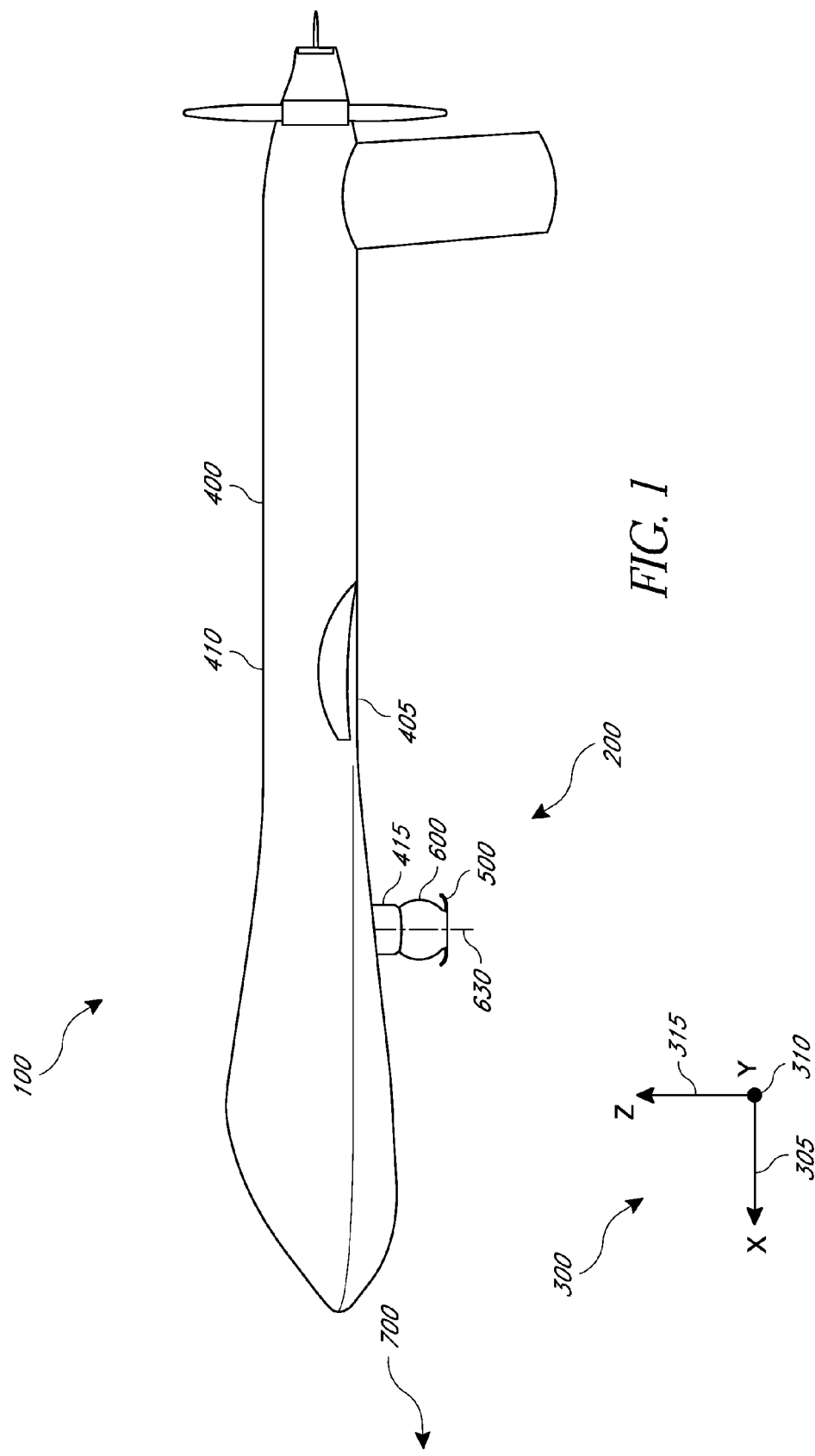
FIG. 1 depicts a side view of an embodiment of an apparatus for control of flow over the window of an optical instrument housing mounted on an aerial vehicle.
Figure 2:
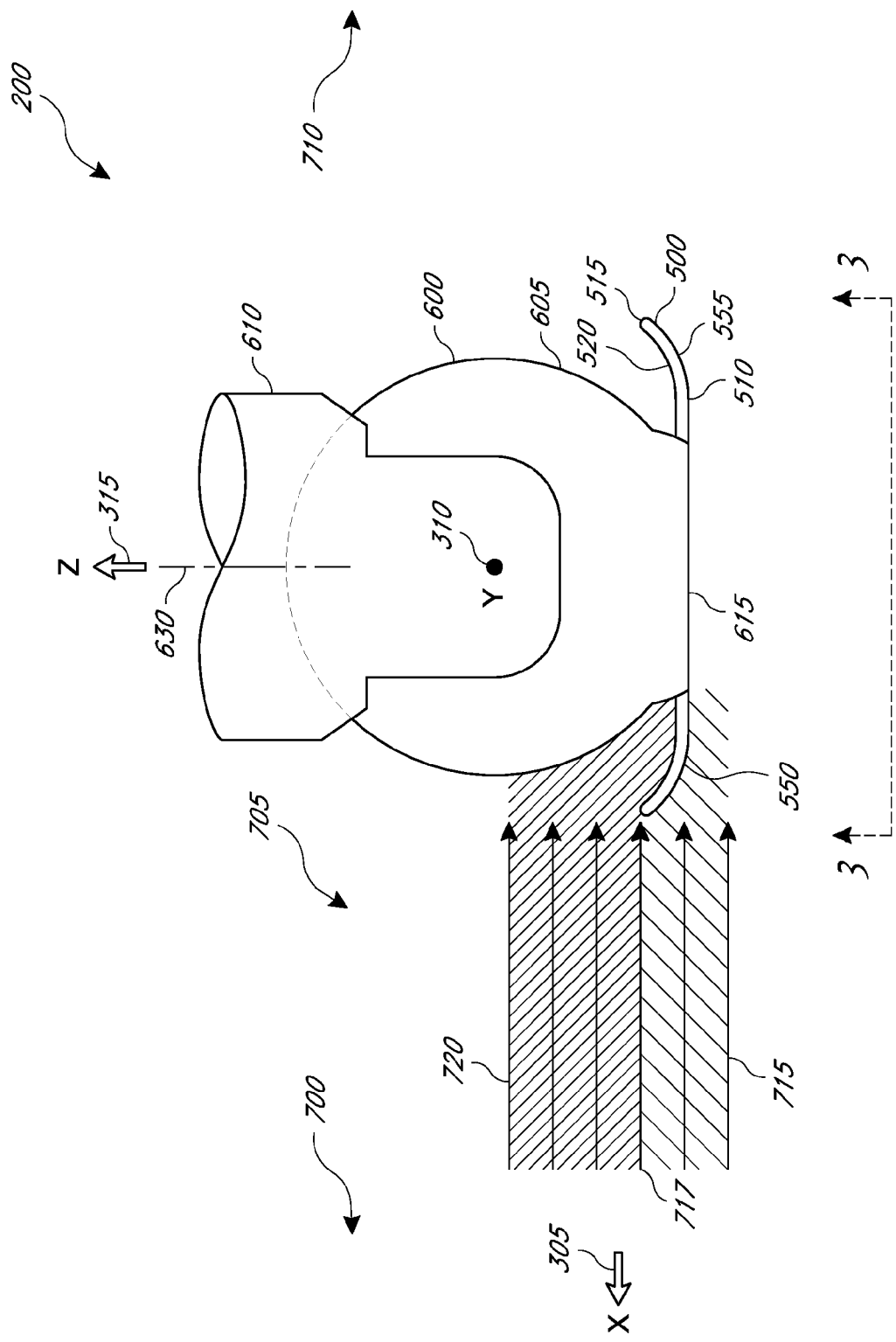
FIG. 2 depicts a side view of the apparatus of FIG. 1 coupled to a housing and splitting a freestream flow field into two flow domains.
Figure 5:
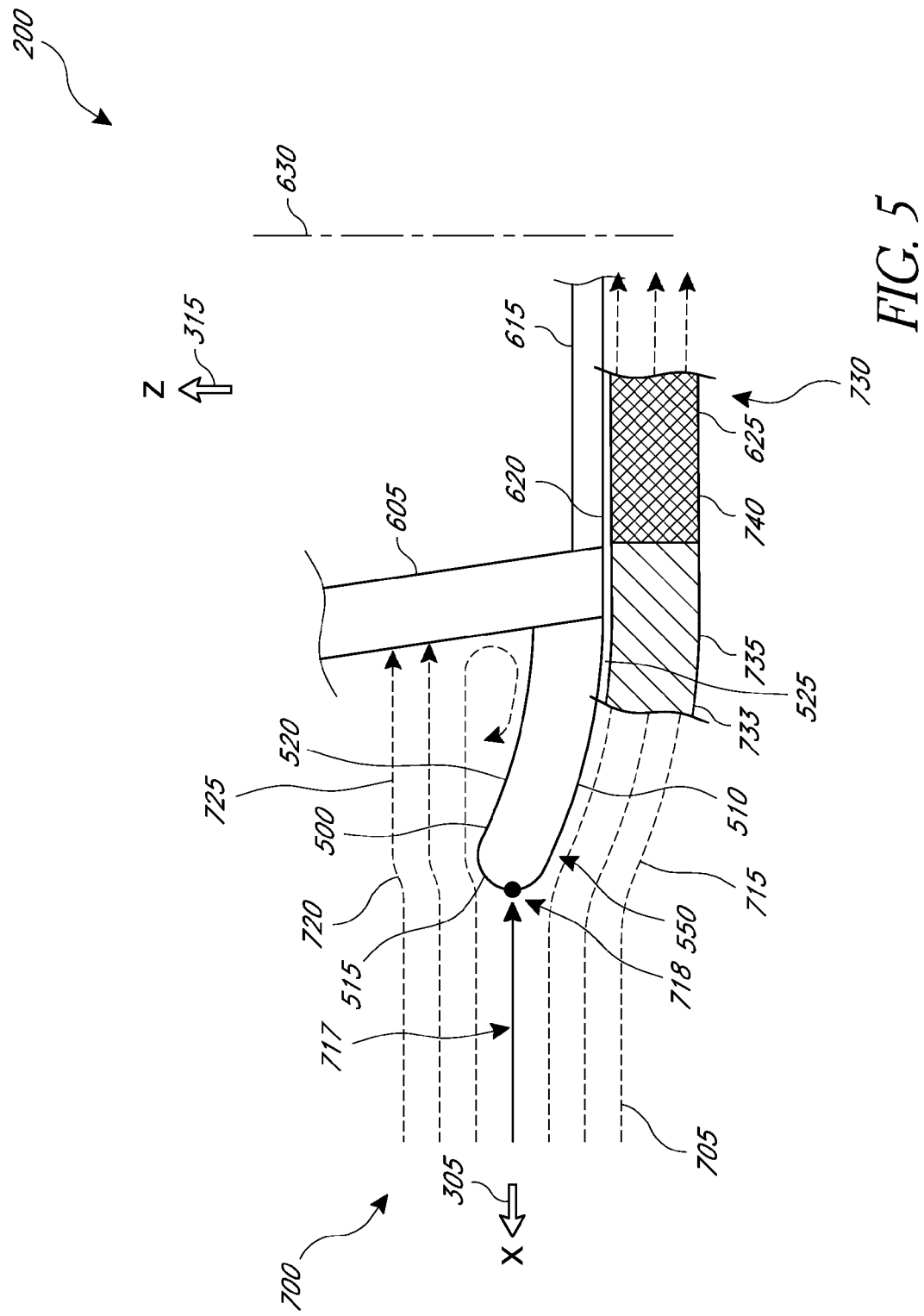
FIG. 5 depicts a section view of embodiments of two flow domains around the apparatus of FIG. 1, with one of the domains containing a region of aero-optical flow.

The term "freestream flow field" is used herein in its ordinary sense as understood by those of skill in the art to refer to the far flow field that occurs when there is relative motion between a device (e.g., the device 500 or the vehicle 400 to which the device 500 is attached as depicted in FIG. 1) and a surrounding fluid medium. In such situations, the freestream flow field is the flow that has not yet been altered or otherwise influenced by the device. The flow field 700 illustrated in FIGS. 1, 2 and 5 is an example of a freestream flow field as described in greater detail below. As shown, it is essentially the flow field moving in the direction opposite of the direction of travel of the vehicle (and hence of the device 500), unless there is a strong crossflow, such as a crosswind, or some other reason that the direction of flow in the surrounding environment, such as the atmosphere, would not be aligned with the direction of travel of the vehicle. In aircraft terms, the "angle of attack" would be the angle between the direction of travel of the vehicle (e.g., the vehicle 400 and the device 500) and the free stream flow field. However, all that is required is relative motion, such that a stationary device in a moving fluid, such as an object in a blowing wind, would still be in a free stream flow field. The freestream flow field does not refer to the flow that is being altered, diverted, or otherwise influenced by the object, such as the device 500 or vehicle 400.

The terms "aero-optical flow", "aero-optical flow region" and similar terms are used herein to refer to near-field fluid flow that is conducive to successful propagation of electromagnetic energy beams through the fluid flow. Such beams include, but are not limited to, optical beams. Aero-optical flow has improved, i.e. reduced spatial and/or temporal density gradients, in the near-field fluid flow in planes that are substantially perpendicular to the direction of propagation of the beam. The aero-optical flow density gradients are reduced relative to what the density gradients in the near-field flow over the housing would be without the use of the device. "Near-field" is used herein in its ordinary sense as understood by those of skill in the art to refer to the region of turbulent flow in the vicinity of an object without the device (such as a housing 600 without the device 500), produced by the presence of solid boundaries, such as the boundaries of a physical housing. Therefore, the flow in an aero-optical flow region will have reduced gradients, or differences, in space and over time in the near-field flow in the aforementioned planes compared to, for example, more turbulent and/or separated flow. The aero-optical flow region thus may be a laminar flow region, which refers to fluid flow in smooth layers with minimal disruption between the layers. Thus, for example, the aero-optical flow region may be a laminar flow region and can be represented by generally parallel lines as illustrated in FIG. 5 in the first flow domain 715. However, the aero-optical flow need not be laminar flow. As described in greater detail below, aero-optical flow includes flow across an optical window that allows for an improved optical field of view as compared to more turbulent and/or separated flow. Thus, for example, the flow region 733 over the optical window 615 illustrated in FIG. 5 can provide improved image quality as compared to turbulent and/or separated flow even when the flow region 733 is not perfectly or substantially laminar. Those skilled in the art will understand that if a device such as the device 500 is oriented at an angle to the direction of the free stream flow field 700, the portion of the flow field 705 over the device 500 may not be perfectly or substantially laminar over the device 500 and the optical window 615, but the flow may nonetheless be sufficiently aero-optical for the instruments to perform at an improved level as compared to the performance without the device 500. This may include sufficiency for achieving a certain desired Strehl ratio. Thus, the portion of the flow field 705 in these situations over the device 500 would be considered "aero-optical flow" for the purposes of this disclosure.

The term "optical instrument" is used herein in its ordinary sense as understood by those of skill in the art to refer to sensors or other devices which may benefit from the improved near-field aero-optical flow. Therefore, an optical instrument may refer to an optical transmitter and/or receiver, as well as other devices configured to receive and/or transmit various forms of electromagnetic energy, such as optical, visual, infrared (IR), near IR, thermal IR, microwave, etc. The instrument may include, but is not limited to, passive sensors, active sensors, imaging sensors, microwave radiometers, synthetic aperture radar (SAR), inverse synthetic aperture radar (ISAR), meteorological radar, forward looking IR, etc.

Figure 3B:
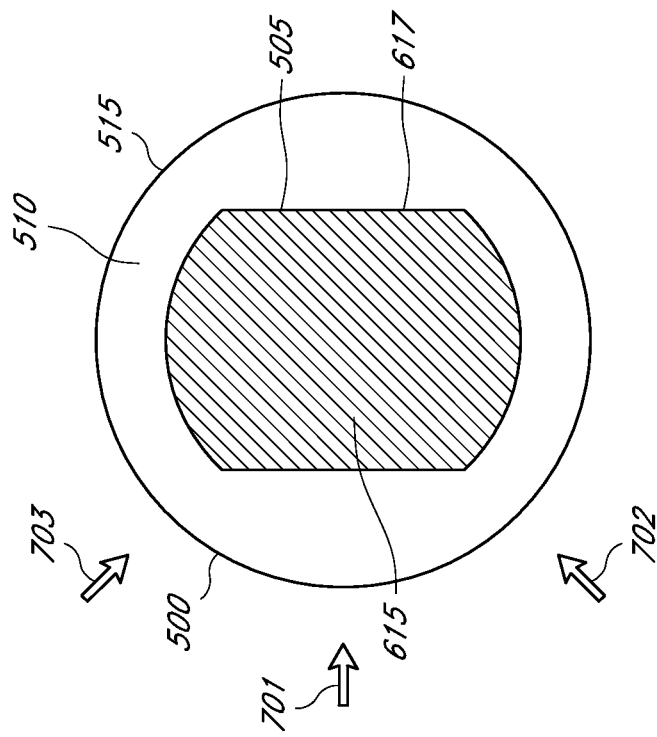
FIGS. 3A-3B depict bottom views of different embodiments of the apparatus and window of FIG. 1.
Figure 3A:
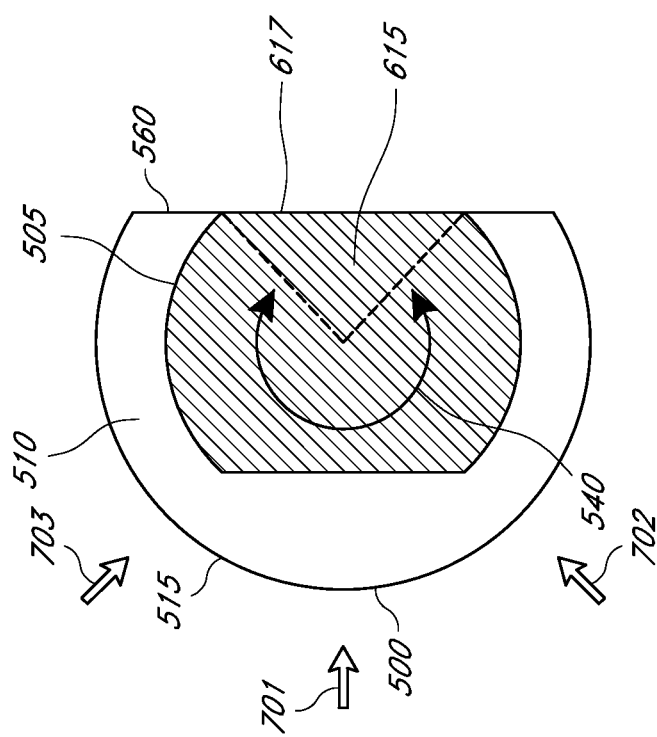

The term "arcuate" is used herein in its ordinary sense as understood by those of skill in the art to refer to an arc or curved shape of an object or device when viewed from a particular vantage point, e.g., the top or bottom. For example, the arcuate top surface 510 of the device 500 forms an arc as illustrated in FIGS. 3A-3B and described in greater detail below. "Arcuate" thus includes any arc or curved shape, whether simple or complex, e.g., circular, elliptical, a combination, or some other curved shape defining the path that a cross-section of the device sweeps out.

The term "inner perimeter" is used herein in its ordinary sense as understood by those of skill in the art to refer to an inner surface (or portion thereof) of an object or device. For example, in the context of FIGS. 3A-B, the inner perimeter 505 refers to the portion of the device 500 that is closest to a window 615 when installed on a housing 605, as described in greater detail below. Thus, an inner perimeter of a device may be an edge, sharp or rounded, have holes for attachment, or any other geometry needed for the inner portion of the device to fit onto or mate with the housing or an adapter on the housing.

The term "complement" is used herein in its ordinary sense as understood by those of skill in the art to refer to the mating or fitting of one device or object to another. For example, in the context of FIGS. 3A-B, the inner perimeter 505 is configured to fit (and thus complement) the perimeter of the housing 600, which may be the window 615, as described in greater detail below. Thus, "complement" refers to such a fitting. For example, if an outer part of a housing is rounded and another part is flat, then a device that complements such a housing will have a partially rounded and a partially flat inner perimeter, in order to fit such a shape of the housing. The term "complement" includes this fitting and any other geometry to which the device is configured to fit, including geometry of an adapter.

The term "substantially flush" is used herein in its ordinary sense as understood by those of skill in the art to refer to configurations in which two surfaces are coplanar or nearly coplanar where they meet together to form an interface (e.g., the interface 800 in FIGS. 8A-8D). For example, FIG. 8A illustrate configurations in which a top surface 525 of the device 500 is substantially flush with an outer portion 620 of the window 615. Those skilled in the art will understand that the term "substantially flush" includes configurations in which the surfaces are exactly coplanar, as well as nearly coplanar configurations that still produce the desired aero-optical flow region 733 over the window 615.

The term "substantially contiguous" is used herein in its ordinary sense as understood by those of skill in the art to refer to configurations in which two or more surfaces together form an uninterrupted surface or a surface with only a very small gap, or gaps, that do not disturb flow across the two or more surfaces. For example, "substantially contiguous" includes configurations such as those illustrated in FIG. 4A in which an outer surface of structures 525, 535, 605 and 620 together form an uninterrupted surface as discussed in greater detail below.

The term "range of angular orientations" and similar terms are used herein in their ordinary sense as understood by those of skill in the art to refer to the orientation of a device with respect to the direction of a free stream flow field. For example, as illustrated in FIG. 1 and discussed in greater detail below, the device 500 is attached to moveable optical instrument housing 600, both of which can be rotated about a pitch axis (elevation angle), and/or a yaw axis (azimuth angle), and/or a roll axis (roll angle), including combinations thereof. The term "range of angular orientations" includes any of these rotations, alone or in combination.

FIG. 1 depicts an embodiment of a flow control system 100 including a flow control subsystem 200 on a vehicle 400 in a freestream flow field 700. The vehicle 400 may include a top side 410 and a bottom side 405. A side view is shown of an embodiment of the flow control subsystem 200 coupled to the bottom side 405 of the vehicle 400. In some embodiments, the vehicle 400 is an aerial vehicle, such as an aircraft as shown in FIG. 1. However, the type of vehicle is not critical. For example, in some embodiments, the vehicle 400 may be an unmanned aerial vehicle (UAV), a drone, a remote control flying craft, a missile, a helicopter, or any other airborne structure in the freestream flow field 700. The vehicle 400 may further be a static or stationary structure in a moving fluid medium. In some embodiments, the vehicle 400 may be a tower or building in a windy atmosphere. The vehicle 400 may also be vehicles or structures that operate in or otherwise contact fluid mediums other than air. In some embodiments, the vehicle 400 may be an underwater vehicle, such as a submarine, submergible, or remotely operated underwater vehicle (ROV). Other scenarios where there is relative motion between the flow control subsystem 200 and the freestream flow field 700, although not explicitly addressed herein, are within the scope of the present disclosure.

For reference, FIG. 1 also shows an axis system 300. The axis system 300 includes a roll axis or X axis 305, a pitch axis or Y axis 310, and a yaw axis or Z axis 315. Positive directions for the X axis 305 and Z axis 315 are indicated by the arrows on the respective axes as shown. The positive direction for the Y axis 310 is out of the plane of the paper, or in accordance with the right hand rule. Angular rotations about the three axes 305, 310, 315 are about angles that are herein referred to as a roll angle 306, an elevation angle 311, and an azimuth angle 316, respectively. In some embodiments, the axis system 300 is defined relative to the vehicle 400. For instance, in some embodiments the vehicle 400 is an aerial vehicle with the +X direction in the direction of the nose of the aircraft, the +Y direction roughly in the direction of the left wing, and the +Z direction defined according to the right-hand rule, i.e. vertically up as shown. In some embodiments, the freestream flow field 700 is in the −X direction, as shown. In some embodiments, the top side 410 of the vehicle 400 is on the +Z side of the vehicle 400 and the bottom side 405 is on the −Z side. Therefore, unless otherwise stated or implied by context, the orientations referred to herein relating to the X, Y, and Z directions are as shown in FIG. 1.

In some embodiments, the flow control subsystem 200 includes a housing 600 with a device 500 for controlling fluid flow over the housing 600. The subsystem 200 may be integral with the vehicle 400 or coupled to the vehicle 400 by structurally mounting the subsystem 200 directly to the vehicle 400. The subsystem 200 may be rigidly attached, mounted, connected, etc. to the vehicle 400 with screws, rivets, fasteners, etc. In some embodiments, an attachment 415, such as a mounting structure or other in-between structure, is between the subsystem 200 and the vehicle 400. In some embodiments, the attachment 415 is a modular connection structure attached to or integral with the vehicle 400 such that many different subsystems 200 may be connected to and disconnected from the vehicle 400 via the attachment 415. In some embodiments, the flow control subsystem 200 is coupled to the bottom side 405 of the vehicle 400. In other embodiments, the flow control subsystem 200 is coupled to the top side 410. In some embodiments, the flow control subsystem 200 is coupled to the vehicle 400 via the housing 600, as shown. In some embodiments, the housing 600 is mounted to the bottom side 405 of the vehicle 400. In some embodiments, the housing 600 is mounted to the bottom side 405 directly, via an in-between structure, or combinations thereof. Other configurations and positions for the subsystem 200 and the vehicle 400, although not explicitly addressed herein, are within the scope of the present disclosure.

In some embodiments, the housing 600 is a generally symmetric structure, as shown. The housing 600 may be spherical, cylindrical, or any other shape. The housing 600 may also be asymmetric. The housing 600 may possess some symmetric features and some asymmetric features. In some embodiments, the housing 600 is a turret.

In some embodiments, the housing 600 protrudes from the vehicle 400 into the freestream flow field 700. As shown, the housing 600 may protrude into the freestream flow field

700 that is on the −Z side of the vehicle 400. In some embodiments, the housing 600 may protrude into the freestream flow field 700 that is on any side of the vehicle 400, including the +Z side, the +/−Y side, the +/−X side, and/or any positions therebetween.

As shown, the housing may define a housing axis 630. The axis 630 may be coincident with the Z axis 315. The axis 630 may move with the housing 600 as the housing 600 moves, such that the axis 630 is not always coincident with the Z axis 315. In some embodiments, the axis 630 indicates a line of sight of electromagnetic energy that is being received and/or transmitted by an optical instrument in the housing 600. In some embodiments, the electromagnetic energy is parallel or substantially parallel with the axis 630.

In some embodiments, the device 500 is located on a far end of the housing 600 that is farthest from the vehicle 400, as shown in FIG. 1. In some embodiments, the device 500 is located at other locations or positions of the housing 600, such as near the far end of the housing 600, on the side of the housing 600, on a location of the housing 600 that is closer to the vehicle 400, etc. Any other location of the device 500 is contemplated where the device 500 may influence flow from the freestream flow field 700 over the housing 600. In some embodiments, the housing 600 is integral with the vehicle 400 and the device 500 couples to the vehicle 400 at the integral housing 600. For instance, the housing 600 may be a protrusion in the fuselage structure of an aerial vehicle and the device 500 may couple to the protrusion, either directly or via an interface 800. In some embodiments, the housing 600 is pointed in the −Z direction, as shown. This may be a natural or typical orientation and/or position of the housing 600, such that rotations or movements of the housing 600 are with respect to this orientation and/or position.

FIG. 2 depicts a side view of an embodiment of the flow control subsystem 200 in the freestream flow field 700. In some embodiments, the flow control subsystem 200 includes a flow control device 500 and the instrument housing 600. For clarity, the housing 600 and device 500 are shown separate from the vehicle 400. In some embodiments, the housing 600 is an instrument housing with a window 615. The housing 600 may be a single part or it may contain a number of parts. As shown, the housing 600 may include a stationary or static structure 610, a moveable structure 605, and the window 615. The static structure 610 may be integral with the vehicle 400 or it may be rigidly coupled to the vehicle 400. The moveable structure 605 may be rotatably coupled with the static structure 610 such that the moveable structure 605 may rotate or otherwise move relative to the static structure 610.

In some embodiments, the window 615 is at least partially transparent to electromagnetic energy, such as energy in the IR and/or visual band of the electromagnetic spectrum. The window 615 may be any number of materials, including a glass such that the material is an amorphous or non-crystalline solid material that exhibits a glass transition. Such materials include soda-lime glass, silicate glass, metallic alloys, ionic melts, polymers, oxide glasses, glass-ceramics, etc. In some embodiments, the housing 600 houses an optical instrument and the window 615 is an optical window. In some embodiments, the window 615 is on the −Z side of the housing 600 and intersects the housing axis 630. The window 615 may be an aperture or other viewing structure. As shown, the housing may be substantially spherical and the window substantially planar. The housing 600 may be other shapes, as discussed above. Further, the window 615 may be different shapes. In some embodiments, the window 615 is planar as depicted in FIG. 2, but it may also be partially planar, rounded, concave, convex, spherical, elliptical, etc. or any combinations thereof.

In some embodiments, the device 500 is coupled to the housing 600. A side view of the device 500 is shown in FIG. 2 coupled to the housing 600. However, portions of the device 500 that would obscure the +Y side of housing 600 in the view as shown have been removed for clarity. The device 500 may be rigidly attached to the housing 600 with screws, rivets, bolts, adhesive, fasteners, etc. As is discussed in further detail herein, for example with respect to FIGS. 8A-8D, the device 500 may attach to an adapter 545 at an interface 800 with the housing 600. In some embodiments, the device 500 may attach to both the housing 600 and the adapter 545 at the interface 800 to the housing. Many configurations and assemblies of the device 500 with the housing 600, although not explicitly addressed herein, are within the scope of the present disclosure.

In some embodiments, the device 500 has a bottom surface 520, a top surface 510, and an outer perimeter 515. The bottom surface 520 may face the +Z side of the device 500. The top surface 510 may face the −Z side. The outer perimeter 515 may couple the bottom surface 520 to the top surface 510. The outer perimeter 515 may further be that portion of the device 500 that is farthest from the housing axis 630 when installed on the housing 600.

In some embodiments, the device 500 contains an upstream portion 550 and a downstream portion 555. The upstream portion 550 and/or the downstream portion 555 may contain the top surface 510, the bottom surface 520, and/or the outer perimeter 515. The upstream portion 550 and the downstream portion 555 may refer to portions or cross-sections of the device 500 that are aligned with or intersect the X axis. However, the portions 550, 555 may also refer to other portions or cross-sections of the device 500.

As shown, the device 500 may be curved. In some embodiments, the device 500 has curvature such that the top surface 510 and bottom surface 520 are totally or partially curved toward the housing 600, which may be in the +Z direction. In some embodiments, the upstream portion 550 and/or the downstream portion 555 contain a curvature. In some embodiments, the upstream portion 550 and the downstream portion 555 contain similar curvatures. In some embodiments, the upstream portion 550 and the downstream portion 555 contain different curvatures. In some embodiments, parts or portions of the upstream portion 550 and/or the downstream portion 555 are curved while other parts or portions are not curved. It is understood that discussion of any curvature of the upstream (+X) portion 550 and/or the downstream (−X) portion 555 may similarly apply to other portions of the device 500. For example, although FIG. 1 depicts only +X and −X portions of the device 500, other portions, such as +Y and −Y portions or portions between the +/−X and +/−Y portions, of device 500 may have similar features. Therefore, any features and/or capabilities as discussed with respect to one portion of the device 500 may apply, mutatis mutandis, to other portions of the device 500, even if not explicitly indicated.

FIG. 2 further depicts a freestream flow field 700. The direction of the flow of the flow field 700 is in the −X direction, as indicated by the arrows on the ends of the flow lines. The freestream flow field 700 may contain an upstream flow field 705 and a downstream flow field 710, as shown. The upstream flow field 705 is that part of the freestream flow field 700 that is on the +X side of the subsystem 200 and flowing in the −X direction, i.e. flowing towards the subsystem 200. The downstream flow field 710 is that part of the freestream flow field 700 on the −X side of the subsystem 200 and flowing in the −X direction, i.e. flowing away from the subsystem 200. The upstream and downstream flow fields 705, 710 may or may not contact the housing 600 or device 500. In some embodiments, portions of the upstream flow field 705 contact portions of the housing 600 and/or device 500. Therefore, in some embodiments, the fluid flow in the upstream flow field 705 contacts the upstream portions 550 of the device 500, and the fluid flow contacting the downstream portions 555 of the device 500 leaves the device 500 and enters the downstream flow field 710. It is further understood, therefore, that the location of the upstream portions 550 and/or downstream portions 555 may change if the direction of the freestream flow field 700 changes. For instance, the freestream flow field 700 may travel in the +X direction, such that the upstream portions 550 are on the −X side of the device 500 and the downstream portions 555 are on the +X side.

As shown in FIG. 2, an upstream portion 550 of the device 500 extends into the upstream flow field 705 of the freestream flow field 700. In some embodiments, the device 500 is configured to split the upstream flow field 705 into a first flow domain 715 and a second flow domain 720. The respective domains 715, 720 are indicated in FIG. 2 by respective hatching patterns.

In some embodiments, the extent of the first and second flow domains 715, 720 may be designated by a flow domain boundary 717. As depicted, the flow on the +Z side of the boundary 717 may be the second flow domain 720 and the flow on the −Z side of the boundary 717 may be the first flow domain 715. The two domains 715, 720 may or may not mix along that portion of the boundary 717 to the +X side of the device 500. In some embodiments, the boundary 717 may have a thickness, such that a region of mixing defines the thickness. Therefore, the boundary need not be a line. It may be a band or other such region with a thickness. In some embodiments, the freestream flow field 700 is laminar and the two domains 715, 720 do not mix along that portion of the boundary 717 to the +X side of the device 500.

As depicted, the boundary 717 contacts the device 500 at the outer perimeter 515. In some embodiments, the boundary 717 may contact the device 500 in other locations, such as the top surface 510, the bottom surface 520, and/or other locations. For instance, if the device 500 is rotated about the Y axis 310, the boundary 717 may contact the device on the top surface 510 or bottom surface 520, depending on the direction of rotation relative to the direction of the freestream flow field 700. Further, the scope or locations of the two domains 715, 720 may be larger than is indicated in FIG. 2. For instance, the second flow domain 720 may extend farther in the +Z and −X directions, while the first flow domain 715 may extend farther in the −Z and −X directions. For clarity, only portions of the two domains 715, 720 are shown.

As depicted, the second flow domain 720 contacts the upstream portion 550 of the device 500. The second flow domain 720 may contact the upstream portion 550 at the outer perimeter 515. In some embodiments, the second flow domain 720 continues along and over the +Z side of the outer perimeter 515 and then along and over the bottom surface 520. As is discussed in further detail herein, for example with respect to FIG. 5, the second flow domain 720 may be attached, separated, or a combination of the two along or over the outer perimeter 515 and/or the bottom surface 515. The second flow domain 720 on or over the outer perimeter 515 and the bottom surface 520 may thus be laminar, turbulent, etc. or combinations thereof.

In some embodiments, the second flow domain 720 also contacts the housing 600. As shown, the second flow domain 720 contacts the moveable housing structure 605. The second flow domain 720 may also contact the static housing structure 610 and/or any other parts of the housing 600, as well as the vehicle 400 (not shown). Further, the second flow domain 720 may flow around any of these parts. For example, the second flow domain 720 may also flow around the +Y and −Y sides of the housing 600. In some embodiments, the second flow domain 720 may also flow along the downstream portion 555 of the device 500 and contact the bottom surface 520 and/or the outer perimeter 515. The second flow domain 720 may then leave the device 500 and enter the downstream flow field 710, which is in the −X direction relative to the device as shown.

As depicted, in some embodiments the first flow domain 715 may contact the upstream portion 550 of the device 500. The first flow domain 715 may initially contact the upstream portion 550 at the outer perimeter 515 or the top surface 510. In some embodiments, the first flow domain 715 continues along the −Z side of the outer perimeter 515 and then along the top surface 510. The first flow domain 715 may then continue along the window 615 that is between the upstream portion 550 and the downstream portion 555 of the device 500. The first flow domain 715 may then continue to the downstream portion 555 of the device 500. At the downstream portion 555, the first flow domain 715 may flow along the top surface 510 and/or the outer perimeter 515. Further, the first flow domain 715 may flow on, over and/or around the device 500 and/or the housing 600. For example, the first flow domain 715 may flow on, over and/or around the +Y and −Y sides of the device 500 along the outer perimeter 515 and/or the top surface 510. In some embodiments, the first flow domain 715 may be attached, separated, or a combination of the two along the outer perimeter 515, the top surface 510 and/or the window 615. The first flow domain 715 on or over the −Z side of the outer perimeter 515, the top surface 510, and/or the window 615 may thus be laminar, turbulent, etc. or combinations thereof. Further, as is discussed in further detail herein, for example with respect to FIG. 5, a region or regions of aero-optical flow may be present in the first flow domain 715 in any location or locations along the device 500 and window 615, including but not limited to the upstream portion 550 and/or downstream portion 555 of the device 500 and/or the window 615. The first and second flow domains 715, 720 may mix in the downstream flow field 710 to the −X side of the downstream portion 555 of the device 500.

In some embodiments, the subsystem 200 may include the device 500 as integral with the housing 600. In some embodiments, the subsystem 200 may include the housing 600 and the device 500 that is integral with the housing. In some embodiments, the device 500 that is integral with the housing 600 protrudes from the housing 600 in the form of a lip, flange, rim, flare or structure with a shape and/or geometry that resembles the device 500 as described herein. The device 500 may be integral with the moveable housing structure 605, the window 615, and/or any other parts or components of the subsystem 200. In some embodiments, the integral device 500, such as in the form of a lip, is configured to split the freestream flow field 700 into the first flow field 715 above the lip and window 615 and a second flow field 720 under the lip and around the housing 600. In some embodiments, the first flow field 715 comprises an aero-optical flow region that extends at least partially over the top surface 510 of the lip and continues at least partially over the window 615. In some embodiments, the aero-optical flow region is maintained within a range of angular orientations of the axis 630 relative to the freestream flow, as is discussed in further detail herein, for example with respect to FIG. 6.

FIGS. 3A and 3B depict bottom views of different embodiments of the device 500 with the window 615 as viewed from the direction indicated in FIG. 2. For clarity, other structures of the housing 600 are not shown in FIGS. 3A and 3B. As shown in both FIGS. 3A and 3B, the device 500 is configured around the window 615. The window 615 may have an outer perimeter 617. As shown, the outer perimeter 617 may be flat on two sides and rounded on two sides. Other shapes and configurations of the outer perimeter 617 are possible. In some embodiments, the outer perimeter 617 is completely rounded, circular, elliptical, etc. or it may be a polygonal shape with multiple sides such as a square, or combinations thereof.

The device 500 may further have an inner perimeter 505. In some embodiments, the inner perimeter 505 may complement the outer perimeter 617 of the window 615. For example, the window 615 as shown has an outer perimeter with two flat sides and two rounded sides, and the inner perimeter 505 of the device 500 likewise has two each of complementary flat sides and rounded sides that complement the respective sides of the window 615. Therefore, in some embodiments, the contours of the various sides of the inner perimeter 505 match, copy, correspond, pair with, align, imitate, replicate, emulate, mimic or otherwise complement the outer perimeter 617 of the window 615. Further, while the inner perimeter 505 is shown complementing the window outer perimeter 617, the inner perimeter 505 may instead or in addition complement other features of the housing 600. In some embodiments, the inner perimeter 505 may complement an object such as a seal or adapter between the device 500 and the housing 600, as is discussed in further detail herein, for example with respect to FIGS. 4, 8B and 8C.

The device 500 may further be arcuate, as shown in FIGS. 3A and 3B. In some embodiments, the top surface 510 and/or outer perimeter 515 are arcuate. For example, the top surface 510 and outer perimeter 515 may be swept around and thereby form an arc or arcs around the window 615 and/or other features of the housing 600. The arc may be any number of arcuate shapes including an arc or arch, and it or they may be curved, circular, semicircular, elliptical, may be combinations thereof, may have smooth and/or sharp transitions between various different arcuate sections, etc. In some embodiments, the bottom surface 520 may also be arcuate. In some embodiments, the bottom surface 520 is similarly arcuate as the top surface 510 and/or outer perimeter 515. The various arcuate features may thus be similarly or differently arcuate for a given angular location or circular coordinate of the device 500.

As shown, the top surface 510 and outer perimeter 515 may be arcuate around a portion of the window 615. As shown, the device 500 sweeps out an arc for an angular amount indicated by an angle of sweep 540. In some embodiments, the angle 540 is less than three hundred and sixty degrees, for example three hundred degrees. The angle 540 may be other amounts as well, including ninety degrees, one hundred and eighty degrees, two hundred and seventy degrees, etc. In FIG. 3B, the device completely surrounds the window 615 such that the angle 540 is three hundred and sixty degrees.

For devices sweeping out angles 540 that are less than three hundred and sixty degrees, the device 500 may have one or more end surfaces 560. The end surfaces 560 as shown in FIG. 3A are on either end of the arcuate arc swept out by the device 500. The end surface 560 may be any number of shapes at various orientations. In some embodiments, the end surface 560 has a smooth trailing edge. In some embodiments, the end surface 560 has an abrupt blunt end. In some embodiments, the end surface 560 is tapered. In some embodiments, the device 500 has end surfaces 560 that are symmetric about a plane (such as the X-Z plane as oriented in FIG. 2). In some embodiments, the device 500 has end surfaces 560 that are asymmetric, In some embodiments, the device 500 may be positioned in different orientations with respect to the direction of the freestream flow field 700. The free stream flow field 700 may thus approach the device 500 from different directions. As shown in FIGS. 3A and 3B, the device 500 may be rotated or otherwise moved such that the freestream flow field 700 approaches the device in the direction indicated by arrow 701, by arrow 702, or by arrow 703. The freestream flow field 700 may further approach the device 500 from other directions and/or any directions therebetween, including directions opposite of those indicated by arrows 701-703. Further, the freestream flow field 700 may likewise approach the device 500 in different planes, for instance if the device rotates about the Y axis 310, as is discussed in further detail herein for example with respect to FIG. 6.

Figure 4A:
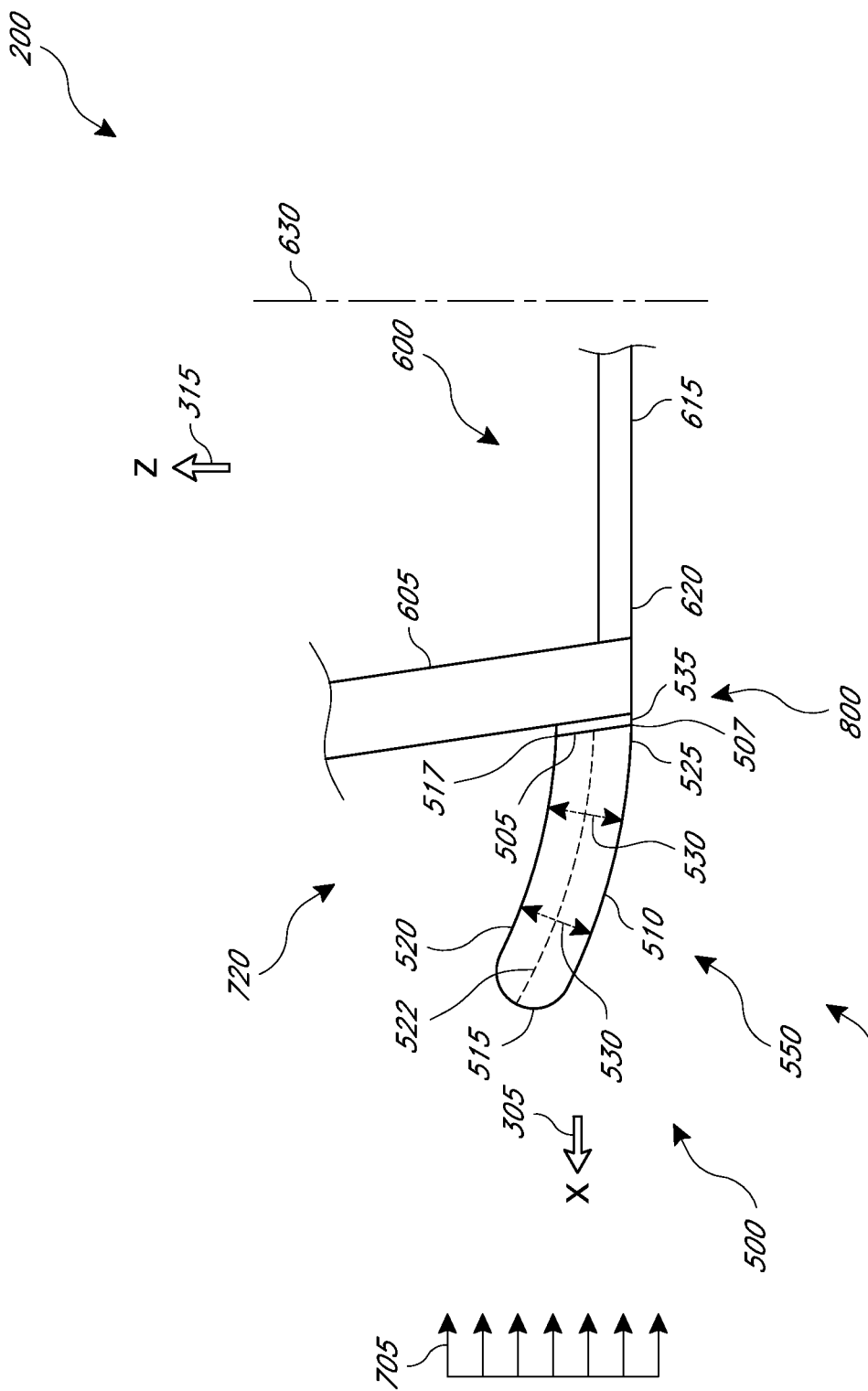
FIGS. 4A-4B depict section views of embodiments of an upstream portion of the apparatus and window of FIG. 1.

FIG. 4A depicts a section view of an embodiment of the upstream portion 550 of the device 500 and housing 600 with window 615. In some embodiments, the inner perimeter 505 is coupled to the top surface 510, which is coupled to the outer perimeter 515, which is coupled to the bottom surface 520. In some embodiments, the device 500 is an integral, single, or otherwise monolithic piece such that the inner perimeter 505, the arcuate top surface 510, the outer perimeter 515 and the bottom surface 520 refer to various locations of the same piece. In some embodiments, the inner perimeter 505, the top surface 510, the outer perimeter 515, the bottom surface 520, and parts or combinations thereof are separate parts that are combined to form the device 500. For instance, each may be a separate part such that the device 500 constitutes four surfaces that may be joined to form the complete device 500. Or, for example, the top surface 510 and outer perimeter 515 may be a first integral part and the bottom surface 520 and inner perimeter 505 may be a second integral part. The first and second integral parts may then be joined to form the complete device 500. It is thus understood that any and all of these or other configurations known to the art may constitute a "coupling" of the inner perimeter 505, the top surface 510, the outer perimeter 515 and the bottom surface 520. The description of one such configuration is not meant to limit the scope of the present disclosure.

The device 500 may be made from any number of suitable materials. In some embodiments, the device 500 is metallic. The device 500 may instead or in addition be plastic, polymeric, ceramic, composite, fiber, or any combinations thereof. Further, the device 500 may be solid, hollow, or any combinations thereof, such as semi-porous and/or having a non-uniformly distributed material density. In some embodiments, the device 500 includes the same material as the housing 600. For instance the device 500 may be integral with the housing 600 and thus constitute similar materials and/or material properties as the housing 600. In some embodiments, the device 500 is completely impermeable to fluid flow. For example, the device 500 may be sealed so that the flow of fluid such as air or water may not be able to penetrate, permeate, enter, pass through, seep into, or otherwise get into or through the device 500.

In some embodiments, the inner perimeter 505, the top surface 510, the outer perimeter 515 and the bottom surface 520 together form a closed contour that defines an outer boundary or edge of a cross section of the device 500. In some embodiments, the device 500 includes a plurality of such cross sections. In some embodiments, at least one of the cross sections is arcuately swept or otherwise extended or extruded at least partially around the outer perimeter 617 of the window 615. In some embodiments, at least one of the cross sections is swept at least 180 degrees around the outer perimeter 617 of the window 615. In some embodiments, at least one of the cross sections is swept at least partially into the upstream flow field 705. In some embodiments, at least one of the cross sections is in a plane such that at least part of the upstream flow field 705 in the plane is perpendicular to a line that is tangent to a point on an edge of the cross section. Although FIG. 4A depicts a cross section of the device 500 that is located on the upstream portion 550 of the device 500, this cross section could be located at any angular position along the arcuate device 500, including the downstream portion 555.

In some embodiments, the outer perimeter 515 is the farthest feature of the device 500 from the housing axis 630. In some embodiments, the outer perimeter 515 is a leading edge and faces the upstream flow field 705. In some embodiments, a segment of the contour of the cross section of the outer perimeter 515 is rounded. The outer perimeter 515 may also comprise one or more radial, elliptical, and/or straight segments, or any combinations thereof. For instance, the outer perimeter 515 may have various segments each with varying radii of curvature. It may further follow a contour defined by an equation or function describing a rounded surface configured for inducing aero-optical flow.

In some embodiments, the outer perimeter 515 is coupled to the bottom surface 520. The transition from the outer perimeter 515 to the bottom surface 520 may be smooth. Further, the outer perimeter 515 may transition to the bottom surface 520 on the +X side of the device 500 or on the +Z side of the device 500. In some embodiments, the bottom surface 520 faces the second flow domain 720. As shown, this may be on the +Z side of the device 500 which also may partially face the housing 600.

In some embodiments, the outer perimeter 515 is coupled to the top surface 510. The transition from the outer perimeter 515 to the top surface 510 may be smooth. Further, the outer perimeter 515 may transition to the top surface 510 on the +X side of the device 500 or on the −Z side of the device 500. In some embodiments, the top surface 510 faces the first flow domain 715. As shown, this may be on the −Z side of the device 500 which may also face away from the housing 600. In some embodiments, the top surface 510 and the outer perimeter 515 form a substantially smooth surface.

In some embodiments, the top surface 510 has an inner portion 525. The inner portion 525 is the area or region of the top surface 510 that is nearest or adjacent to the housing 600. In some embodiments, it is the last portion of the top surface 510 over which fluid in the first flow domain 715 flows before it reaches the housing 600, which may be the moveable housing structure 605 such as a wall or edge of a wall of the structure 605.

In some embodiments, the inner portion 525 of the top surface 510 is coupled to the bottom surface 520 via the inner perimeter 505. Thus the bottom surface 520, the outer perimeter 515, the top surface 510 and the inner perimeter 505 may form a continuous surface of device 500. The transition 507 from the inner portion 525 of the top surface 510 to the inner perimeter 505 may be sharp, as shown. The transition 507 may also be smooth, stepped, or any combinations thereof. The transition 517 from the bottom surface 520 to the inner perimeter 505 may likewise be sharp, as shown, or it may be smooth, stepped, or any combinations thereof.

In some embodiments, the top surface 510 and the bottom surface 520 define a thickness 530. In FIG. 4A, the thickness 530 is indicated at two different sections of the device 500 by the dashed, double arrowed lines. These are merely illustrative locations of the thickness, and it is understood that the thickness 530 may be located anywhere between the top surface 510 and the bottom surface 520. In some embodiments, the thicknesses 530 shown in FIG. 4A are different lengths, such that the thickness 530 of the device 500 is not uniform. In some embodiments, the thickness is uniform, substantially uniform, substantially nonuniform, or any combinations thereof. For example, the thickness 530 may be uniform for most of the device 500 with a minority portion near the outer perimeter 515 tapering into a smaller thickness 530. Thus, in some embodiments, the thickness 530 may also be between various parts of the segment defining the outer perimeter 515. By "uniform" it is understood that this refers to a thickness that is the same over an indicated portion. By "nonuniform" it is understood that this refers to a thickness that changes, in any manner, at any two sections of the device from the outer perimeter 515 of the device to the inner perimeter 505. For example, nonuniform includes a thickness 530 that tapers smoothly or that changes abruptly. Further, the device 500 may have a uniform thickness 530 in one cross section of the device 500 but have a nonuniform thickness in 530 another cross section of the device 500. Therefore, the thickness 530 may change along the arcuate sweep of the device 500. In some embodiments, the thickness 530 at or near the inner perimeter 505 is about three quarters of an inch (0.75").

As further shown in FIG. 4A, the device 500 has a curvature. In some embodiments, the curvature of the device 500 curves toward the second flow domain 720 and/or toward the housing 600. In some embodiments, the top surface 510 has a curvature. In some embodiments, the bottom surface 520 has a curvature. The curvature of the top surface 510 may be radial, elliptical, convex, bulging, arched, protuberant, raised, may be defined by an equation, or any combinations thereof. The curvature of the bottom surface 520 may be radial, elliptical, concave, cupped, sunken, arched, may be defined by an equation, or any combinations thereof. The curvature of the surfaces 510, 520 may further include straight sections. For example, the top surface 510 may comprise a first curvature, then a straight section, and then a second curvature. Other configurations and variations of the curvature of the device 500, although not explicitly addressed herein, are within the scope of the present disclosure.

Further, the bottom surface 520 may have a variety of different curvatures. In some embodiments, the bottom surface 520 may have none or very little curvature. For example, the bottom surface 520 may be substantially straight. In some embodiments, the bottom surface 520 may have a curvature that is symmetric with the top surface 510. In some embodiments, portions of the bottom surface 520 near the housing 600 may curve farther in the +Z direction, as oriented in FIG. 4A, such that the bottom surface 520 eventually gradually matches the slope of a part of the housing 600, such as the moveable structure 605.

In some embodiments, the device 500 has a camber defined by a camber line 522. The camber line 522 may be a line halfway between the upper surface 510 and lower surface 520. Thus, the contour of the camber line 522 may be indicative of the curvature of the device 500. For example, as shown in FIG. 4A, the camber line 522 curves toward the +Z direction, as does the curvature. In some embodiments, the top surface 510 may be symmetric with the bottom surface 520 such that the top and bottom surfaces 510, 520 may be equidistant from the camber line 522 at a given section. This may be seen along the thicknesses 530 indicated in FIG. 4A, where the top surface 510 may be the same distance as the bottom surface 520 from the camber line 522 at these thicknesses 530. In some embodiments, the camber line 522 is curved with any number of extrema and inflection points. In some embodiments, therefore, the camber line 522 may be reflexed such that the camber line 522 curves back up near the housing 600 toward the inner portion 525. In some embodiments, the camber line 522 is straight.

As further depicted in FIG. 4A, the device 500 and the housing 600 form an interface 800. The interface 800 between the device 500 and housing 600 may be in a number of configurations. As shown, in some embodiments the device 500 complements a seal 535 that is between the device 500 and the housing 600. In some embodiments, the inner perimeter 505 of the device 500 complements the seal 535. In some embodiments, the inner perimeter 505 adheres to, is fastened to, attaches to, or otherwise mechanically couples with the seal 535. In some embodiments the seal 535 is a separate part from the device 500 and the housing 600. For instance, the seal 535 may couple with the inner perimeter 505 and the housing 600, such as the moveable housing structure 605. In some embodiments, the seal 535 is integral with the device 500. In some embodiments, the seal 535 is integral with the housing 600.

In some embodiments, the seal 535 may have an elongated cross section such that it completely separates the device 500 from the housing 600. In some embodiments, the seal 535 is as wide as it is thick, or wider. In some embodiments, the seal 535 may have a round cross section. In some embodiments, the seal 535 may have a larger cross sectional area as compared to after it is coupled in the interface 800 between the device 500 and the housing 600. In some embodiments, the seal 535 may not entirely separate the device 500 from the housing 600. For instance, the seal 535 may only separate a portion of the inner perimeter 505 from the housing 600, while another portion of the inner perimeter 505 butts directly against or is otherwise mechanically coupled directly with the housing 600. In some embodiments, the inner perimeter 505 may have a stepped contour where the seal 535 has a complementary stepped contour. In some embodiments, the seal 535 may be between the bottom surface 520 and/or top surface 510 of the device 500 and the housing 600. For instance, the seal 535 may have a U-shaped cross section that surrounds the inner perimeter 505, the inner portion 525 or more of the top surface 510 and/or an inner portion or more of the bottom surface 520.

In some embodiments, the seal 535 has an arcuate shape such that a cross section of the seal 535 is swept, extended, or otherwise extruded around the housing 600 for an angular amount defining a swept contour. In some embodiments, the angular amount is equal or similar to the angle of sweep 540, which corresponds to the angle of sweep 540 of the device 500 (see FIG. 3A). In some embodiments, the angular amount of sweep of the seal 535 is less or more than the angle 540. In some embodiments, the seal 535 is continuous along the entire angular amount of sweep. In some embodiments the seal 535 is discontinuous, such that in some locations along the sweep it has different cross sections. In some embodiments, the seal 535 is comprised of multiple subparts located at various angular locations along the swept angular contour. Further configurations and details of the interface 800 between the device 500 and the housing 600 are discussed herein, for example with respect to FIGS. 8A-8D.

In some embodiments, the seal 535 may prevent, mitigate, or otherwise restrict the passage of fluid from the second flow domain 720 to the first flow domain 715, and vice versa, at the interface 800. In some embodiments, the seal 535 creates an interface 800 that is entirely impermeable to the freestream flow field 700, the first flow field 715 and the second flow field 720, where absolutely no fluid flow is allowed to pass between the device 500 and the housing 600 at the interface 800. The seal 535 may therefore prevent fluid communication between the first and second flow fields 715, 720 at the interface 800. In some embodiments, the seal 535 creates an interface 800 that is substantially impermeable to the freestream flow field 700, the first flow field 715 and the second flow field 720, where there is negligible passage of fluid from the second flow domain 720 to the first flow domain 715, or vice versa, via the interface 800 between the device 500 and the housing 600. The standard for "negligible" as used here is the creation of a region of aero-optical flow in the first flow domain 715. If the passage of fluid through the interface 800 is such that is does not allow for the creation of a region of aero-optical flow, then the passage is more than negligible. "Substantially impermeable" therefore also captures configurations where some flow is allowed to pass between the device 500 and housing 600 but which does not disrupt the flow in the manner described. It is understood that other configurations of the interface 800 between the device 500 and the housing 600, either with or without the seal 535, may provide the same functionality as described above. For instance, the device 500 itself may provide a sealing function such as with the inner perimeter 505 butted against or otherwise mechanically coupled to the housing 600, as is shown and discussed in further detail herein, for example with respect to FIGS. 5 and 8A-8D.

In some embodiments, the device 500 may be flush with the housing 600. In some embodiments, portions or parts of the device 500 are flush with portions or parts of the housing 600. For instance, the inner portion 525 may be level with an edge of the moveable housing structure 605. In some embodiments, the inner portion 525 of the top surface 510 is configured to be substantially flush with an outer portion 620 of the window when the device 500 is coupled with the housing 600. In some embodiments, the inner portion 525 is flush or substantially flush with an edge of the seal 535, which is flush or substantially flush with an edge of the housing structure 605. In some embodiments, the inner portion 525 extends in a parallel manner from the housing structure 605 and/or the window 615. For instance, the window 615 may be flat and the inner portion 525 may likewise be flat and extend away from the window for a given length, such that the inner portion 525 continues the surface of the window 615 for that length.

In some embodiments, the device 500 may be contiguous with the housing 600. In some embodiments, an inner portion 525 of the top surface 510 is substantially contiguous with the outer portion 620 of the window 615 when the device 500 is coupled with the housing 600. In some embodiments, an inner portion 525 of the top surface 510 is substantially contiguous with an edge of the seal 535, which is substantially contiguous with the outer portion 620 of the window 615, such that a substantially contiguous surface is formed by the inner device portion 525, the edge of the seal 535, and the inner window portion 620. In some embodiments, the inner device portion 525, the inner window portion 620, and/or an edge of the seal 535 are coplanar. In some embodiments, the inner device portion 525, the inner window portion 620, and/or an edge of the seal 535 are not coplanar. In some embodiments, the slope of the inner device portion 525 substantially matches the slope of the outer window portion 620. In some embodiments, the slope of the inner device portion 525 substantially matches the slope of an edge of the seal 535, which substantially matches the slope of the outer window portion 620. Other configurations at the interface 800 are discussed further herein, for example with respect to FIGS. 8A-8D.

Figure 4B:
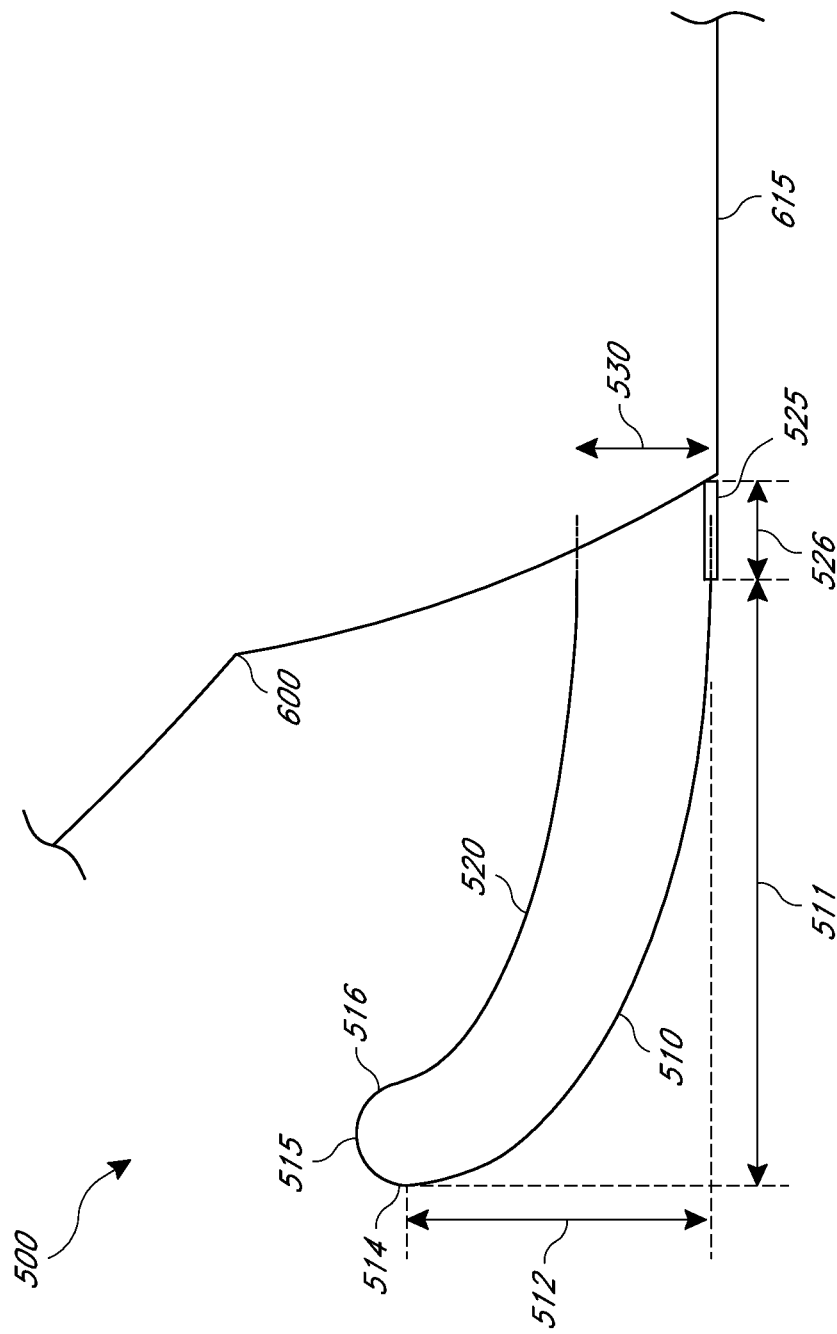

FIG. 4B depicts geometric features of a section view of an embodiment of an upstream portion of the device 500. As shown, the geometry of the device 500 may be described in part by an inner portion length 526, a top surface length 511, and a top surface height 512. The inner portion length 526 refers to the horizontal distance from one end of the inner portion 525 to the opposite end in a direction that is perpendicular to the housing axis 630. In some embodiments, the inner portion 525 is flat and perpendicular to the housing axis 630, as shown. Thus, the inner portion length 526 may be the same as the length of the inner portion 525. In some embodiments, the inner portion 525 is rounded, partially rounded, partially flat, flat but at an angle to the axis 630, or combinations thereof. Thus the inner portion length 526 may be different from the length of the inner portion 525. In some embodiments, the inner portion 525 is flat and perpendicular to the axis 630, and the inner portion length 526 is about half an inch (0.5").

The top surface length 511 refers to a horizontal distance of the top surface 510 beyond the inner portion 525 in a direction that is perpendicular to the housing axis 630. As shown, the top surface length 511 extends from an end of the inner portion 525 that is farthest from the axis 630 and continues perpendicularly outward away from the axis 630 until it is coextensive with the outer-most edge of the device 500. This outer-most edge may be the outer perimeter 515, the top surface 510, or a transition point 514 between the two. In some embodiments, the top surface length 511 is within the range of one and one half inches (1.5") to two and one quarter inches (2.25"), inclusive. In some embodiments, the top surface length 511 is about two and one quarter inches (2.25").

The top surface height 512, as shown, refers to a vertical distance from one end of the inner portion 525 of the top surface 510 to a transition point 516 between the top surface 510 and the outer perimeter 515. In some embodiments, the top surface height 512 is within a range from eighty-five hundredths of an inch (0.85") to one and one half inches (1.5"), inclusive.

The geometry of the device 500 may further be defined by an aspect ratio. The aspect ratio is the ratio of the top surface length 511 to the top surface height 512. In some embodiments, the aspect ratio is within the range of one and one half (1.5) to one and three quarters (1.75), inclusive. In some embodiments, the window 615 is twelve and eight-tenths inches (12.8") across, the inner portion length 526 is one half inch (0.5"), the top surface length 511 is two and one quarter inches (2.25"), the top surface height 512 is one and one half inches (1.5"), and thus the aspect ratio is one and one half (1.5).

Further shown in FIG. 4B is the outer perimeter 515 having a radius. In some embodiments, the outer perimeter 515 transitions to the top surface 510, and vice versa, at transition point 514. In some embodiments, the outer perimeter 515 transitions to the bottom surface 520, and vice versa, at transition point 516. The transition points 514, 516 may be locations on the edge of the device 500 where the respective surfaces share a tangency. For instance, at transition point 514, both top surface 510 and outer perimeter 515 may have similar slopes. Thus a line tangent to the top surface 510 at transition point 514 has the same slope as a line tangent to the outer perimeter 515 at transition point 514. This may also apply to transition point 516. As shown, the outer perimeter 515 is a radius that is tangent to the top surface 510 at transition point 514 and to the bottom surface 520 at transition point 516. In some embodiments, the outer perimeter 515 has a radius within the range of one quarter inch (0.25") to one sixteenth of an inch (0.0625"), inclusive. In some embodiments, the radius of the outer perimeter 515 is one sixteenth of an inch (0.0625").

The device 500 may also have the thickness 530 as shown where the device 500 interfaces with the housing 600. In some embodiments, the thickness is about three-quarters of an inch (0.75"). Therefore, in some embodiments of device 500, the inner portion 525 near the housing 600 is three-quarters of an inch (0.75") thick, the inner portion length 526 is one half of an inch (0.5"), the top surface length 511 is two and one quarter inches (2.25"), the top surface height 512 is one and one half inches (1.5"), the aspect ratio is one and one half (1.5), and the outer perimeter 515 is rounded with a radius of one sixteenth of an inch (0.0625").

The various configurations for the interface 800 between the device 500 and the housing 600 allow for smooth and substantially uninterrupted flow of fluid from at least the inner portion 525 of device 500 to the outer portion 620 of the window 615, such that the flow is more conducive for successful operation of an optical instrument in the housing 600. The flow of fluid at and around the interface 800 will now be discussed with respect to FIG. 5.

FIG. 5 depicts embodiments of the first and second flow domains 715, 720 at and around the interface 800 of the device 500 and housing 600. As shown, the first flow domain 715 contains a region 733 with aero-optical flow, as indicated by the cross-hatched area. As noted elsewhere herein, aero-optical flow as used herein refers to flow with reduced density gradients as compared to flow over the housing 600 without the device 500. The reduced gradients in the region 733 may be in planes perpendicular to the housing axis 630, which may or may not be aligned with the Z axis 315.

In some embodiments, the region 733 may extend from the upstream portion 550 of the outer perimeter 515 across the entire window 615 and to the outer perimeter 515 at the downstream portion 555 (shown in FIG. 2) of the device 500, or any portion or portions thereof. In some embodiments, the region 733 may extend at least partially over the top surface 510 and continue at least partially over the window 600. As shown, in some embodiments the region 733 may extend from the inner device portion 525 to the outer window portion 620. The region 733 may contact those parts over which it is present. For example, the region 733 in FIG. 5 may contact the inner device portion 525, the housing structure 605, and the outer window portion 615. The region may extend away from the device 500 and housing 600 in the −Z direction, as oriented in FIG. 5. In some embodiments, the extent of the region 733 in the −Z direction, as oriented, is similar to a diameter or width of the window 615.

FIG. 5 further depicts an optical instrument field of view (FOV) 625. The FOV 625 is the area through which the electromagnetic energy is transmitted and/or received by an instrument inside the housing 600. As depicted, the FOV 625 is abbreviated or shortened. FIG. 5 only shows that portion of the FOV 625 that intersects with the portion of the region 733 that is depicted. In some embodiments, the FOV 625 may extend further in the +Z and/or −Z directions, as well as further in the +X and/or −X directions.

By inducing reduced density gradients in the region 733, the device 500 improves the flow near the housing 600 and window 615. This improved near-field flow prevents, reduces and/or mitigates aberrations in the wavefront of electromagnetic energy being transmitted and/or received by an optical instrument through the housing window 630.

The optical instrument may operate in the optical or visual band of the electromagnetic spectrum. For an instrument operating in this band, the quality of the medium through which it travels may be characterized by a Strehl ratio. The Strehl ratio is a measure of the quality of optical image formation or of optical resolution in the medium, such as an atmosphere. In some embodiments, the device 500 controls the fluid flow in the instrument's FOV 625 such that it improves the Strehl ratio. In some embodiments, the Strehl ratio in the region 733 is at least 0.7 for electromagnetic radiation at a wavelength of about 1 micrometer.

As mentioned, the first flow domain 715 may be separated from the second flow domain 720 by the boundary 717. The scope or extent of the two domains 715, 720 as shown in FIG. 5 is for illustration only. The domains 715, 720 may continue farther in the +/−X, Y, and/or Z directions. FIG. 5 (and FIG. 2) illustrates that some flow lines from the freestream flow field 700 end up in the first flow domain 705 and others end up in the second flow domain 720. In between, the boundary 717 may contact the device 500 at a point 718. In some embodiments, the point 718 may be a stagnation point. Stagnation points exist at the surface of objects in a flow field where the fluid is brought to rest by the object. Thus, the point 718 may be a point where the local velocity of the fluid is zero. The areas of flow along the device 500 that are downstream of and on either side (+/−Z as oriented) of the point 718 are thus the two flow domains 715, 720.

As shown, in some embodiments the point 718 may be on the outer perimeter 515. In some embodiments, the point 718 may be in other locations on the outer perimeter 515, on the top surface 510, or on the bottom surface 520. The location of the point 718 will depend in part on the orientation of the device 500 relative to the freestream flow field 700.

Further, the second flow domain 720 may include the flow along the bottom device surface 520 and/or along the housing 600. In some embodiments, the second flow domain 720 flows along the moveable housing structure 605 and/or along the static housing structure 610 (not shown in FIG. 5). Further, the second flow domain 720 may have a region or regions of aero-optical flow or any other flow, including turbulent, separated, flow with vortices, etc.

Figure 6:
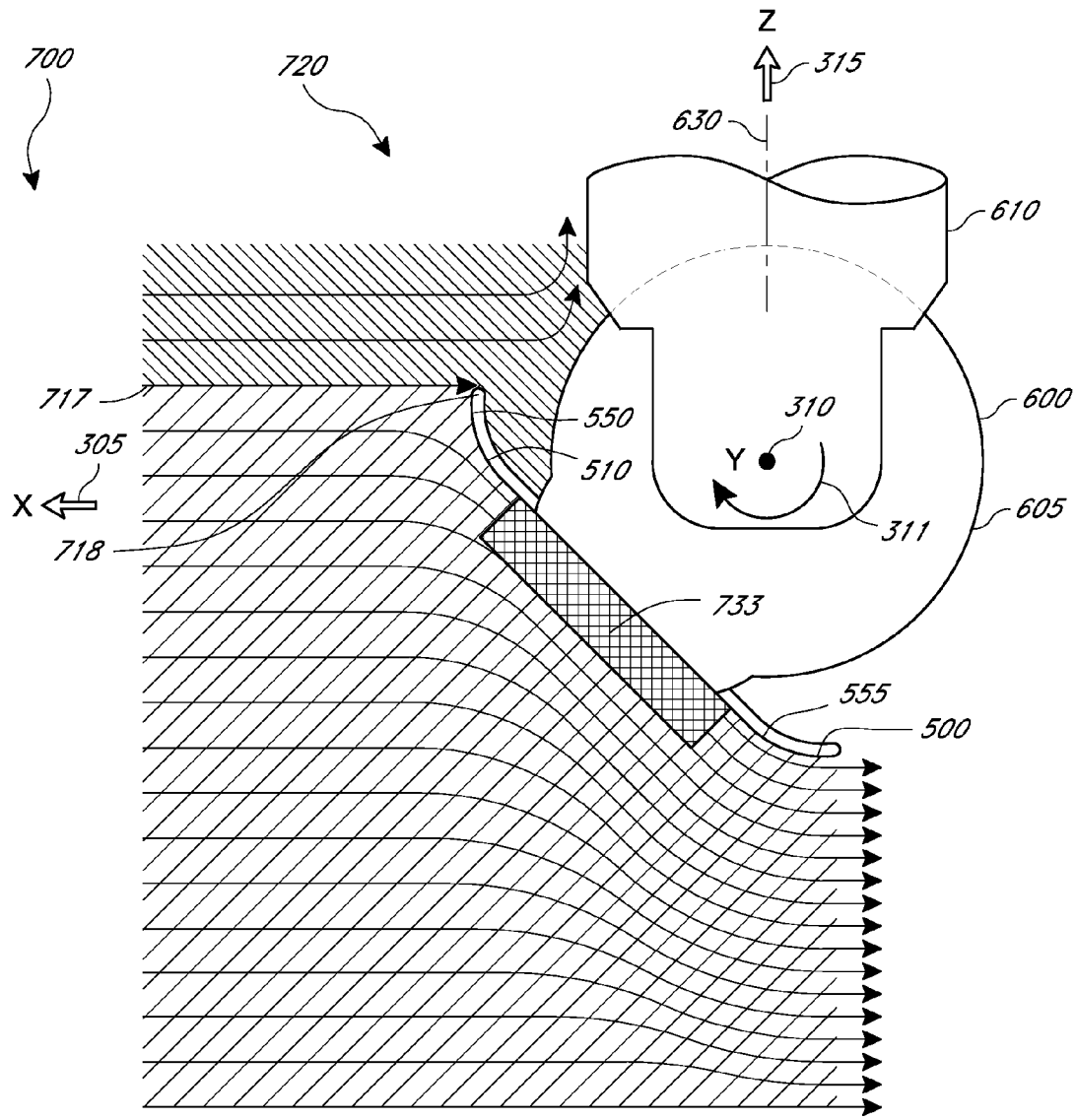
FIG. 6 depicts a side view of the apparatus of FIG. 1 rotated about a pitch axis.

FIG. 6 depicts a side view of the device 500 rotated relative to the freestream flow field 700. As shown, the device 500 is rotated about the Y axis 310 by an elevation angle 311. In some embodiments, the rotation of the device is about the X, Y and/or Z axes. In some embodiments, the rotation is about a roll angle 306, the elevation angle 311, and/or an azimuth angle 316, respectively. In some embodiments, the rotation about any of the axes can sweep out a total angle of plus or minus one hundred and thirty five degrees. In some embodiments, the total swept out angles are one hundred and eighty degrees, or more.

As shown, the moveable structure 605 of housing 600 is rotated about the Y axis 310 over the elevation angle 311. In some embodiments, the device 500 is rigidly coupled to the housing 600 such that the device 500 rotates a similar amount as the housing 600. In some embodiments, the optical instrument housing 600 has two or more degrees of freedom such that it can move in at least two dimensions. In some embodiments, the optical instrument housing 600 is rotatable about the Y axis and the Z axis.

As shown, the second flow domain 720 extends from the +Z side of point 718, over the outer perimeter 515, and over the bottom surface 520. For clarity, the flow of the second flow domain 720 over the housing 600 is not shown. The first flow domain 715 extends from the −Z side of point 718 on the upstream portion 550 of the top surface 510, over the window 615, and over the downstream portion 555 of the top surface 510. The first domain 715 further has an aero-optical flow region 733 over the window 615 and over portions of the device 500. In some embodiments, the region 733 is maintained over a range of angular orientations of the device 500 relative to the direction of the freestream flow field 700. In some embodiments, the region 733 is maintained for angular orientations of the device 500 about any of the axes of plus or minus one hundred and thirty five degrees. In some embodiments, the region 733 is maintained over angular orientations of the device 500 about any of the axes of plus or minus one hundred and eighty degrees or more.

Figure 7:
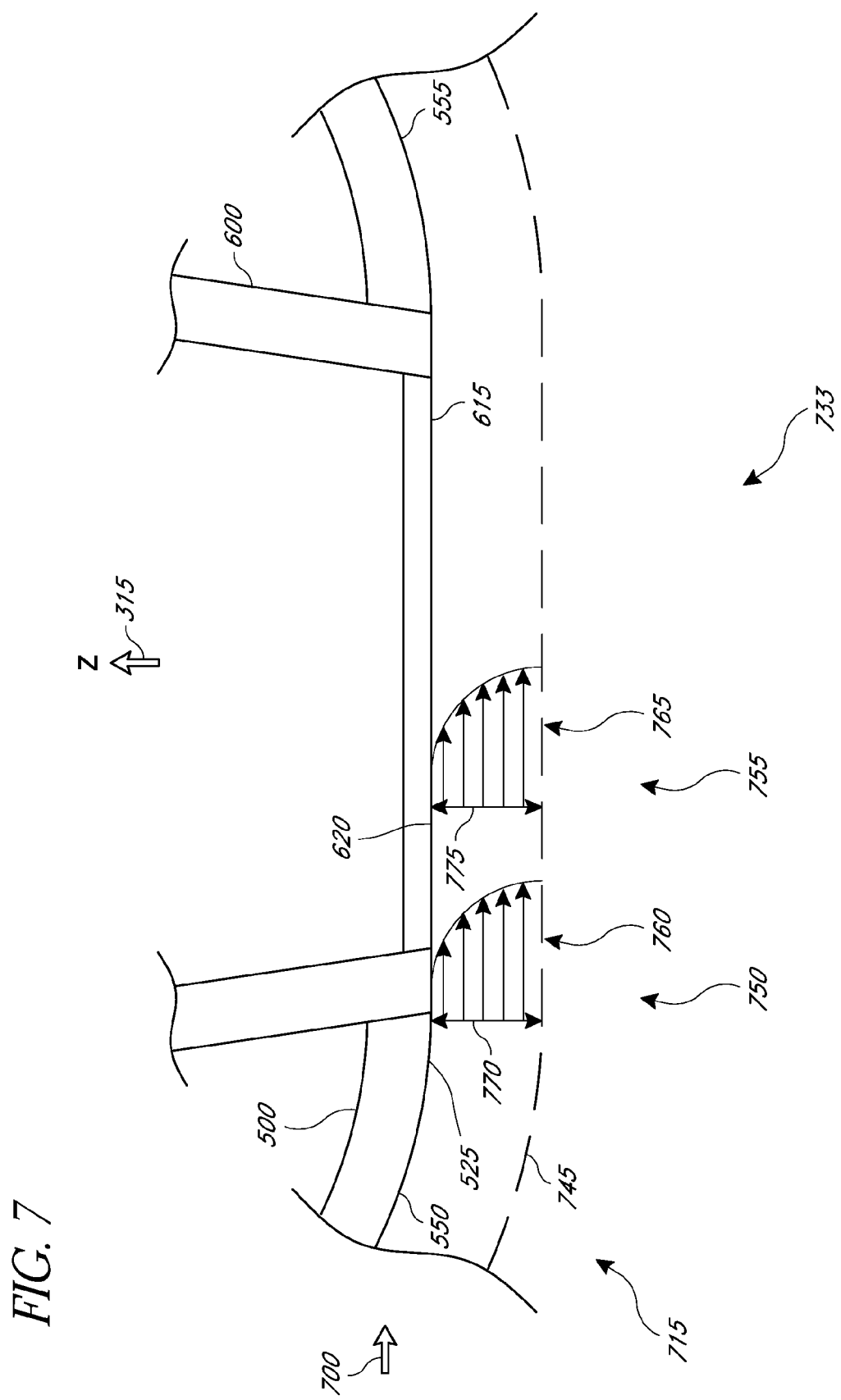
FIG. 7 depicts an embodiment of a laminar boundary layer over the apparatus and window of FIG. 1.

As shown in FIG. 7, the device 500 may be coupled to a housing 600 and subject to a freestream flow field 700 with an aero-optical flow region 733. In some embodiments, a boundary layer 745 may form. The boundary layer 745 may encompass the aero-optical flow region 733, or the aero-optical flow region 733 may encompass the boundary layer 745, or the aero-optical flow region 733 may be co-extensive with the boundary layer 745. In some embodiments, the boundary layer 745 is entirely or substantially in the first flow domain 715. The boundary layer 745 may extend from across the upstream portion 550 of the device 500, over the window 615, and over the downstream portion 555 of the device 500. In some embodiments, the boundary layer 745 is continuous or substantially continuous from the upstream portion 550 of the device 500 to the downstream portion 555. The boundary layer 745 may also be intermittent or continuous over any parts thereof. The boundary layer 745 may contact the various surfaces of the device 500 and housing 600 over which it is located. It may also extend away from the various surfaces, approximately in the −Z direction as oriented in FIG. 7.

In some embodiments, the boundary layer 745 has upstream and downstream velocity profiles 760, 765. As shown, the upstream velocity profile 760 is upstream relative to the downstream velocity profile 765 which is further downstream. The velocity profiles 760, 765 indicate the relative speed of the flow as indicated by the length of the arrows in the profiles 760, 765. For example, the arrows closer to the device 500 are shorter than the arrows farther from the device 500, indicating that the speed of the flow increases with increasing distance from the device 500. In some embodiments, the speed of the flow at the surface of the device 500 is zero. In some embodiments, the speed of the flow in the boundary layer 745 that is farthest from the device 500 is at least ninety-nine percent of the speed of the flow in the freestream flow field 700. In some embodiments, the velocity profiles have thicknesses 770, 775. The thicknesses 770, 775 may be defined by the distance necessary for the speed of the flow in the boundary layer 745 to be ninety-nine percent of the speed of the flow in the freestream flow field 700.

As shown, the upstream velocity profile 760 is over the inner portion 525 of the device 500 and the downstream velocity profile 765 is over the window 615. However, the upstream velocity profile 760 may be in any position upstream of downstream velocity profile 765. In some embodiments, the upstream and downstream velocity profiles 760, 765 are substantially similar. In some embodiments, the length of the velocity arrows, and hence the speed of the flow at a given distance from the respective surfaces, are approximately the same for the two velocity profiles 760, 765. In some embodiments, the thicknesses 770, 775 are approximately the same length.

In some embodiments, the boundary layer 745 includes laminar boundary layer portions 750, 755. As shown, the boundary layer 745 may include a laminar boundary layer portion 750 over the inner portion 525 of the top surface 510 of the device 500. The laminar portion 750 may instead or in addition be over any other part of the device 500, including upstream and/or downstream portions 550, 555 of the device 500. Further, the boundary layer 745 may include a laminar boundary layer portion 755 over the window 615. The laminar portion 755 may instead or in addition be over any other part of the window 615, including the outer window portion 620. Therefore, the laminar boundary layer portions 750, 755 may or may not coincide with the indicated locations of the velocity profiles 760, 765 in FIG. 7.

FIGS. 8A-8D depict various embodiments of the interface 800 between the device 500 and a perimeter associated with the housing 600. By "perimeter," unless indicated otherwise, it is understood that this includes any perimeter which the device 500 may interface 800 with when installed or otherwise assembled with the housing 600 and any other parts at the interface 800. The interface 800 may include the inner perimeter 505 of the device 500, the moveable housing structure 605, the outer perimeter 617 of the window 615, the outer portion 620 of the window 615, and/or other parts. In some embodiments, the inner perimeter 505 is configured to complement the moveable housing structure 605, the outer perimeter 617 of the window 615, the outer portion 620 of the window 615, and/or other parts. In some embodiments, when the device 500 is coupled with the housing 600, the inner portion 525 of the top surface 510 is configured to be substantially flush with the outer portion 620 of the window 615, with other parts of the housing 600, and/or with any other parts at the interface 800. In some embodiments, when the device 500 is coupled with the housing 600, the inner portion 525 of the top surface 510 is configured to be substantially contiguous with the outer portion 620 of the window 615, with other parts of the housing 600, and/or with any other parts at the interface 800. In some embodiments, when the device 500 is coupled with the housing 600, the slope or slopes of the inner portion 525 of the top surface 510 is configured to substantially match the slope or slopes of the outer portion 620 of the window 615, of other parts of the housing 600, and/or of any other parts at the interface 800.

Referring now to FIG. 8A, in some embodiments the interface 800 includes an adapter 545. In some embodiments, the adapter 545 facilitates coupling the device 500 to the housing 600. In some embodiments, the device 500 complements the adapter 545. In some embodiments, the inner perimeter 505 of the device 500 complements the adapter 545. In some embodiments, the adapter 545 is substantially between the device 500 and the housing 600. In some embodiments, the adapter is substantially between the device inner perimeter 505 and the moveable housing structure 605. In some embodiments, the inner perimeter 505 adheres to, is fastened to, attaches to, or otherwise mechanically couples with the adapter 545. In some embodiments the adapter 545 is a separate part from the device 500 and the housing 600. For instance, the adapter 545 may couple with the inner perimeter 505 and the housing 600, such as the moveable housing structure 605. In some embodiments, the adapter 545 is integral with the device 500. In some embodiments, the adapter 545 is integral with the housing 600. In some embodiments, the interface 800 with the adapter 545 also includes the seal 535. The seal 535 may be integral with the adapter 545, with the device 500, or with the housing 600, or it may be a separate part that is not integral with any of the adapter 545, the device 500, or the housing 600.

In some embodiments, the adapter 545 may have an elongated cross section such that it completely separates the device 500 from the housing 600. In some embodiments, the adapter 545 is as wide as it is thick, or wider. In some embodiments, the adapter 545 may have different cross sectional shapes and/or areas at different sections. In some embodiments, the adapter 545 may not entirely separate the device 500 from the housing 600. For instance, the adapter 545 may only separate a portion of the inner perimeter 505 from the housing 600, while another portion of the inner perimeter 505 butts directly against, or is otherwise mechanically coupled directly with, the housing 600. In some embodiments, the inner perimeter 505 may have a stepped contour where the adapter 545 has a complementary stepped contour. In some embodiments, the adapter 545 may contact the bottom surface 520 and/or top surface 510 of the device 500. For instance, the adapter 545 may have a U-shaped cross section that surrounds the inner perimeter 505, the inner portion 525 or more of the top surface 510 and/or an inner portion or more of the bottom surface 520. In some embodiments, the adapter 545 has an arcuate shape such that a cross section of the adapter 545 is swept around the housing for an angular amount defining a swept contour. In some embodiments, the angular amount is equal or similar to the angle of sweep 540, which corresponds to the angle of sweep 540 of the device 500 (see FIG. 3A). In some embodiments, the angular amount of sweep of the adapter 545 is less or more than the angle 540. In some embodiments, the adapter 545 is continuous along the entire angular amount of sweep. In some embodiments the adapter 545 is discontinuous, such that in some locations along the sweep it has different cross sections. In some embodiments, the adapter 545 is comprised of multiple subparts located at various angular locations along the swept angular amount. Further, any features of the seal 535 as discussed above with respect to FIG. 4A are applicable to the adapter 545, and vice versa. For instance, the adapter 545 may likewise prevent, mitigate, or otherwise restrict the passage of fluid from the second flow domain 720 to the first flow domain 715, etc.

As shown in FIG. 8B, the interface 800 may include the device 500 and the housing 600. In some embodiments, the device 500 complements the housing 600. In some embodiments, the inner perimeter 505 of the device 500 complements the housing 600. In some embodiments, the inner perimeter 505 adheres to, is fastened to, attaches to, or otherwise mechanically couples with the housing 600. In some embodiments, the device 500 butts up against the housing 600. In some embodiments, some portions of the device 500 butt up against the housing 600 and other portions of the device 500 are mechanically coupled to the housing 600. Further, any features of the seal 535 as discussed above with respect to FIG. 4A are applicable to the embodiments described with respect to FIG. 8B, and vice versa. For instance, some embodiments of the interface 800 with the device 500 and the housing 600 may likewise prevent, mitigate, or otherwise restrict the passage of fluid from the second flow domain 720 to the first flow domain 715, etc.

As shown in FIG. 8C, the device may include a top surface continuation 512. In some embodiments, the continuation 512 may be an extension of the top surface 510, the bottom surface 520, and/or the inner perimeter 505. In some embodiments, the continuation 512 may continue over the window 615 and/or other parts or portions of the housing 600. In some embodiments, the continuation 512 is transparent to electromagnetic energy. In some embodiments, the continuation 512 is glass. In some embodiments, the continuation 512 is the same or similar material as the window 615. In some embodiments, the continuation 512 acts as the window 615 for the housing 600. Thus, in some embodiments, the housing 600 without the device 500 may not have a window, and installing the device 500 with the continuation 512 to the housing 600 may provide the window 615.

As shown, the device 500 with the continuation 512 may be coupled to the adapter 545. In some embodiments, the adapter 545 is the seal 535. In some embodiments, the adapter 545 may be between the inner perimeter 505 of the device 500 and the housing 600. In some embodiments, the adapter 545 and or the device 500 may couple with the moveable structure 605. In some embodiments, the interface 800 with the continuation 512 may contain no other parts, such that the device 500 and/or the continuation 512 directly contact the housing 600. Further, any features of the seal 535 as discussed above with respect to FIG. 4A are applicable to the embodiments described with respect to FIG. 8C, and vice versa. For instance, some embodiments of the interface 800 with a continuation 512 may likewise prevent, mitigate, or otherwise restrict the passage of fluid from the second flow domain 720 to the first flow domain 715, etc.

FIG. 8D depicts an embodiment of the interface 800 where the window 615 extends to the perimeter of the housing 600. In some embodiments, the window 615 may extend to the edge of the housing 600. In some embodiments, the inner perimeter 505 of the device 500 may couple with the window 615 and/or other parts of the housing 600. In some embodiments, the inner perimeter 505 of the device 500 may couple with the moveable structure 605. In some embodiments where the window 615 extends to the perimeter of the housing 600, the interface 800 may include the seal 535, the adapter 545, and/or any other parts. Further, any features of the seal 535 as discussed above with respect to FIG. 4 are applicable to the embodiments described with respect to FIG. 8D, and vice versa. For instance, some embodiments of the interface 800 where the window 615 extends to the perimeter of the housing 600 may likewise prevent, mitigate, or otherwise restrict the passage of fluid from the second flow domain 720 to the first flow domain 715, etc.

The various flows around the device 500 and the housing 600 may be described with respect to the density of the flow. As mentioned, a region of aero-optical flow 733 is a region of flow with reduced spatial and temporal density gradients in planes perpendicular to the housing axis 630. The reduction in such density is with respect to flow around the housing 600 without the device 500. The present disclosure allows for the flow fields around the housing 600, and in particular over the window 615 and thus in the instrument's field of view 625, to move closer to a flow field where the density does not vary at all in the aforementioned planes.

Figure 9A:
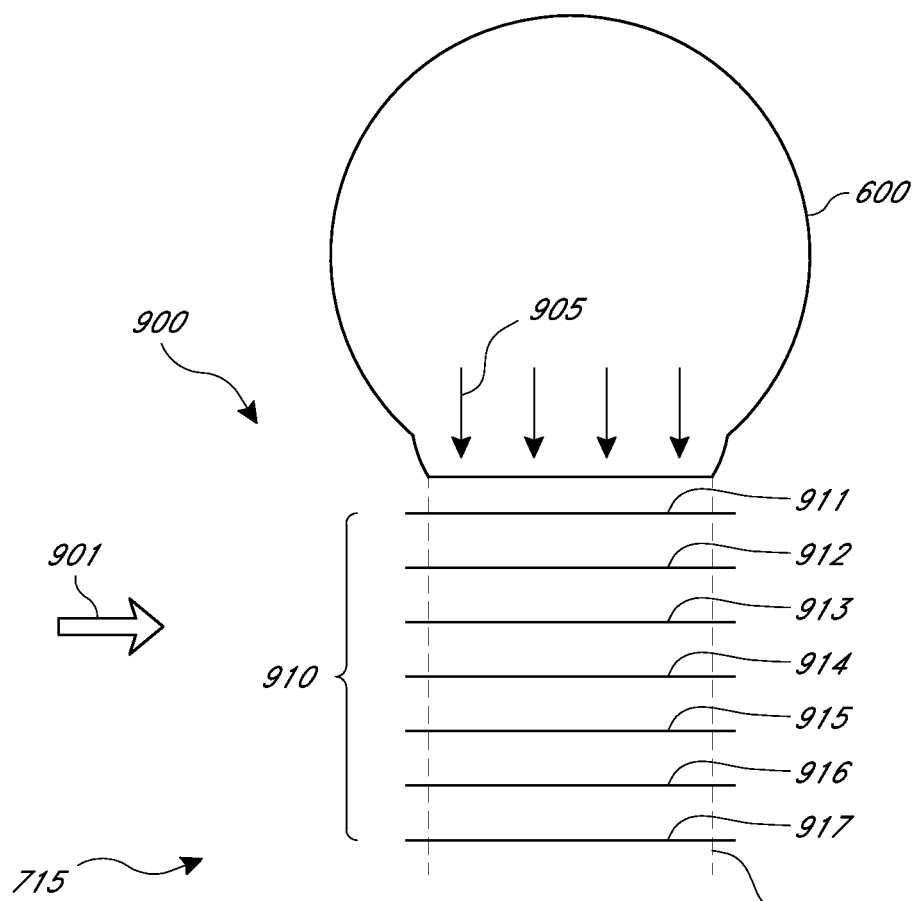
FIGS. 9A-9C depict various embodiments of density isolines in the flow around a housing.

FIG. 9A depicts a density field 900, in the first flow domain 715 within the field of view 625 of a beam of electromagnetic energy along beam direction 905, that is desirable. The flow is in a direction from left to right, as indicated by arrow 901. The density field 900 is represented by isolines 910. Along each isoline, the density of the fluid is the same. Thus, the density of the flow along isoline 911 is the same along that entire line, the density of the flow along isoline 912 is the same along that entire line, etc. As shown, the isolines 910 are perpendicular to the beam direction 905, showing no spatial gradients across the wavefront. This helps prevent the wavefront of the beam from being distorted, as mentioned above.

Figure 9B:
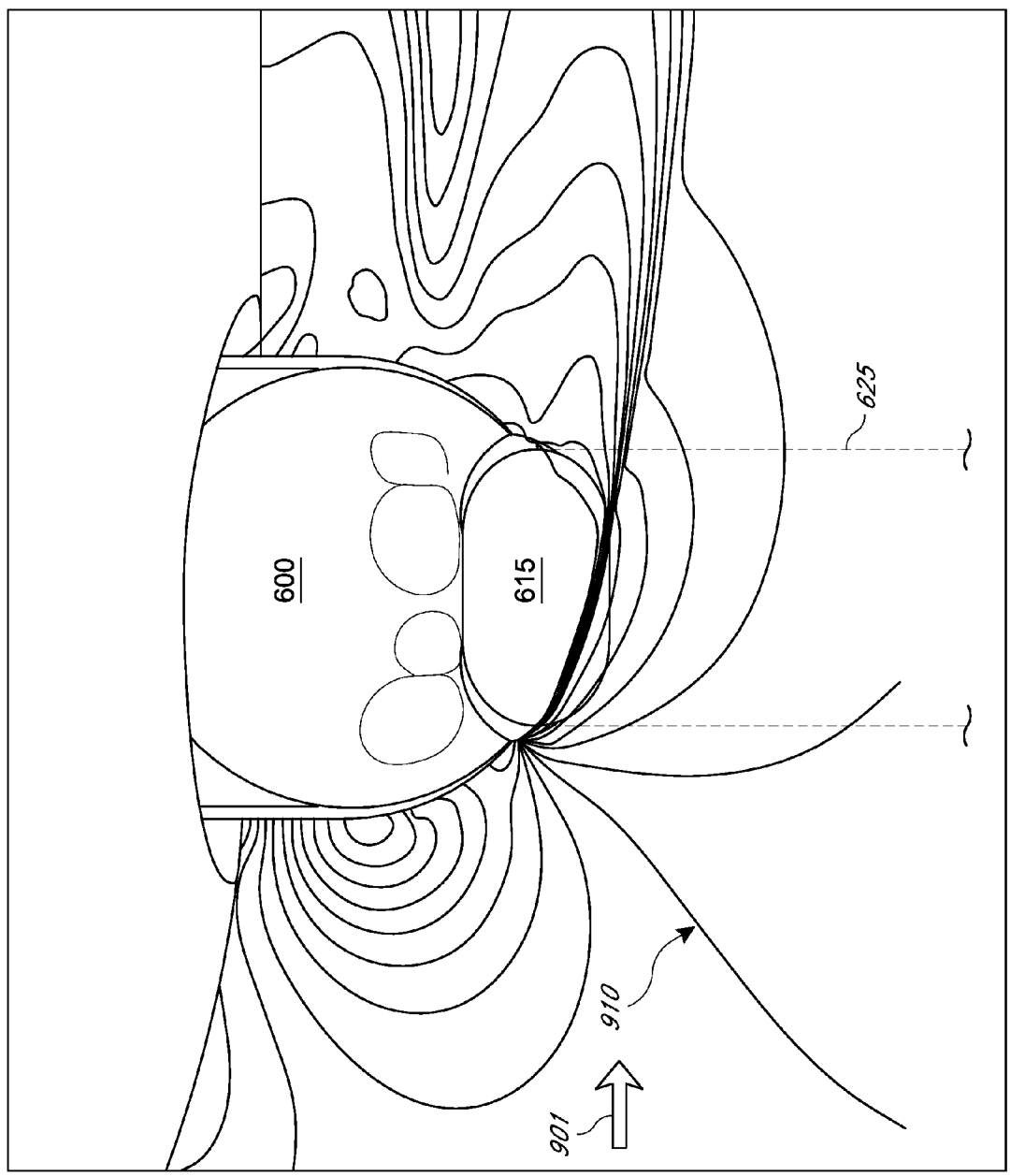

FIG. 9B depicts the resulting density field 900 shown by normalized isolines 910 from a simulation of flow over the housing 600 without the device 500. The flow is in a direction from left to right, as indicated by arrow 901. The isolines 910 are on a plane that is perpendicular to the window 615. As shown, the isolines 910 are severely skewed and non-planar, showing high spatial gradients across the wavefront. The gradients are a consequence of the separated flow over the window 615 and a shear layer in the beam path. The isolines 910 further fluctuate temporally as the flow is separated over the window 615.

Figure 9C:
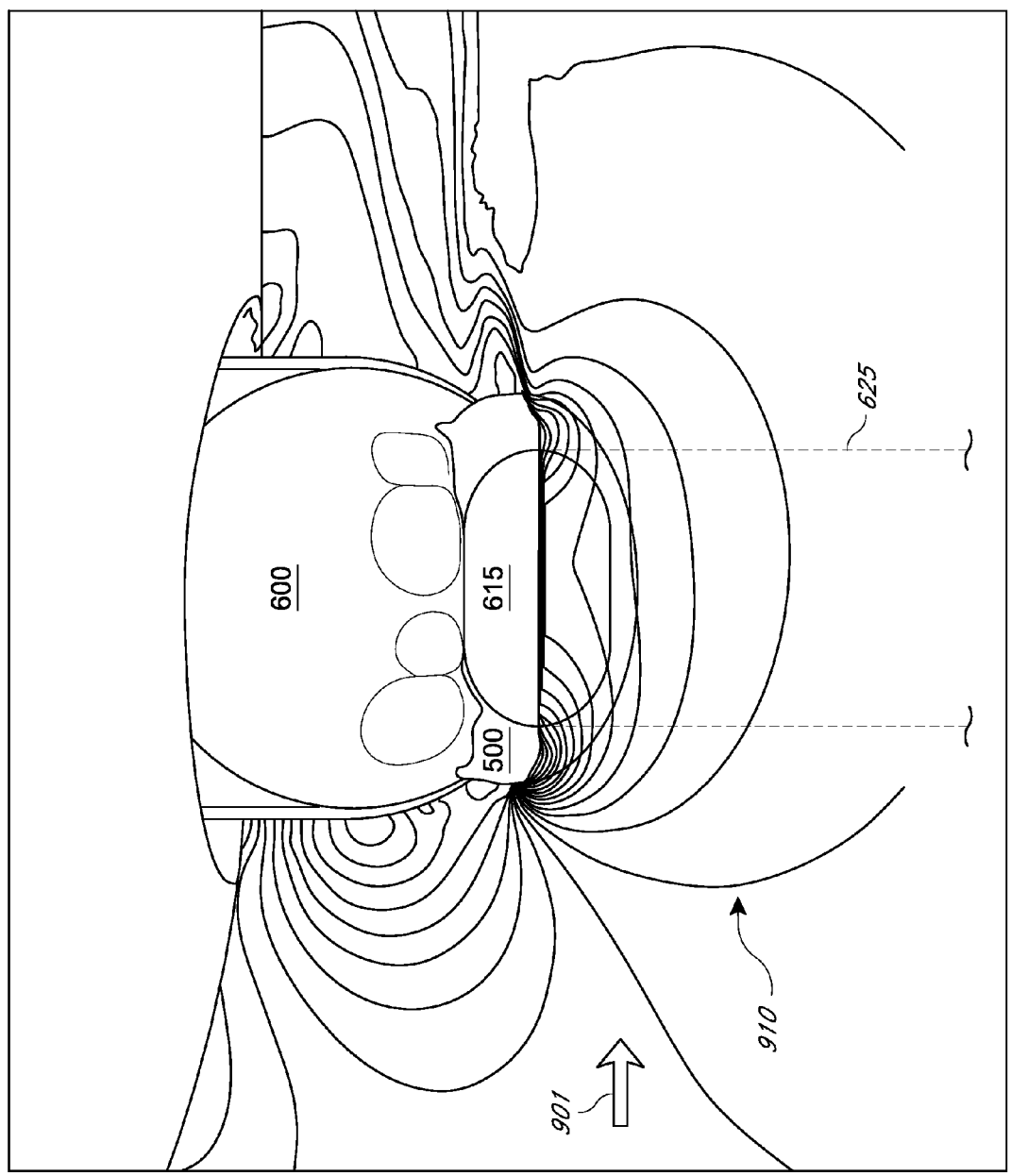

FIG. 9C depicts the resulting density field 900 shown by normalized isolines 910 from a simulation of flow over the housing 600 with the device 500. The flow is in a direction from left to right, as indicated by arrow 901. The isolines 910 are on a plane that is perpendicular to the window 615. As shown in FIG. 9C, the isolines 910 in the density field 900 are much closer to the isolines 910 of desired density field 900 in FIG. 9A than are the isolines 910 in the density field 900 without the device 500 as shown in FIG. 9B. This is especially true over the field of view 625 of the optical instrument. The improved density field 900 in FIG. 9C is due in part to the device 500 maintaining attached flow over the window 615 and the field of view 625. The isolines 910 further do not fluctuate or show substantially reduced fluctuation temporally because the flow is not separated over the window 615.

Figure 10:
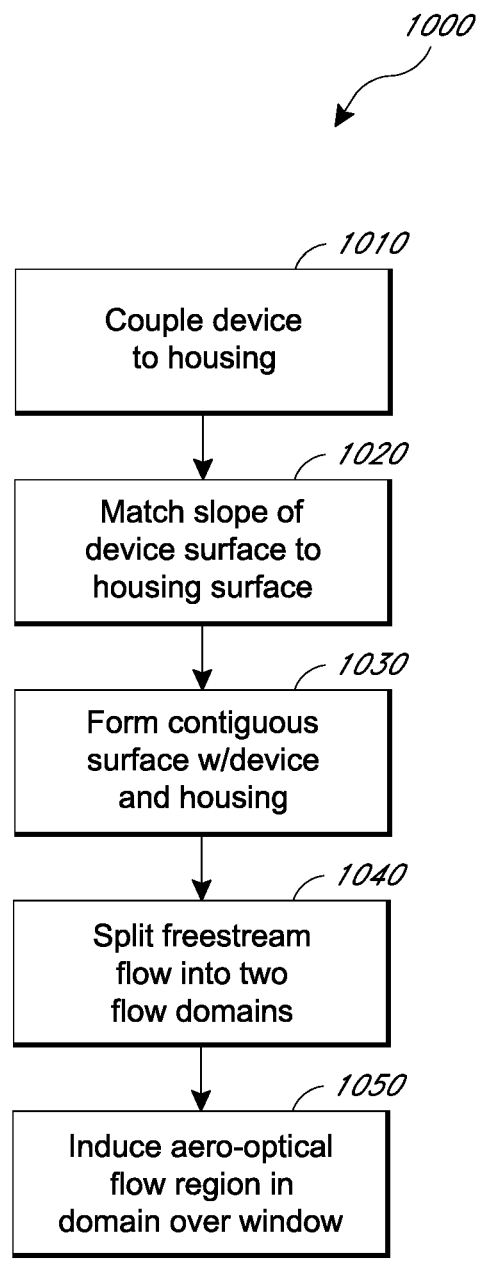
FIG. 10 depicts an embodiment of a method for controlling the flow of fluid over the window of an optical instrument housing in a freestream flow field.

The various configurations for the systems and devices described above may be used in a variety of manners. FIG. 10 depicts an embodiment of a method 1000 for controlling fluid flow over the window 615 of the optical instrument housing 600 on the vehicle 400 in a freestream flow field 700. The method 1000 may include step 1010 wherein the device 500 is coupled to the housing 600. In step 1010, the device 500 may be fastened, adhered, bonded, attached, connected, tied, or otherwise mechanically coupled to the housing 600. In some embodiments, step 1010 includes coupling the device 500 to the housing 600 to produce any of the configurations of the interface 800 described above. For example, the device 500 may be coupled to the housing 600 where the interface 800 includes the seal 535, the adapter 545, the continuation 512, and/or any other parts necessary to mechanically couple the various items. Further, step 1010 includes coupling the device 500 to the housing 600 and/or to any other parts, including the seal 535, the adapter 545, the continuation 512, and/or any other parts necessary to mechanically couple the various items together.

The method 1000 may then proceed to step 1020 where the slope of a surface of the device 500 matches the slope of a surface of the housing 600. This may include matching the slope of any surfaces of the device 500 with any surfaces of the housing 600, as well as any other surfaces present in the interface 800. For example, step 1020 may include matching the slopes of the inner portion 525 of the top surface 510 of the device 500, the edge of the seal 535, the edge of the moveable housing structure 605, and/or the outer portion 620 of the window 615.

The method 1000 may then proceed to step 1030 where a contiguous surface is formed with the device 500 and the housing 600. This may include forming a contiguous surface with any surfaces of the device 500 and any surfaces of the housing 600, as well as any other surfaces present in the interface 800. For example, step 1030 may include forming a contiguous surface with the inner portion 525 of the top surface 510 of the device 500, the edge of the seal 535, the edge of the moveable housing structure 605, and/or the outer portion 620 of the window 615.

Next, the method 1000 may proceed to step 1040 wherein the freestream flow field 700 is split into two flow domains. This may include, for example, splitting the freestream flow field 700 with the device 500 into the first flow domain 715 and the second flow domain 720. This may also include splitting the upstream flow field 705 with the device 500 into the first flow domain 715 and the second flow domain 720.

The method 1000 may then proceed to step 1050 wherein an aero-optical flow region 733 is induced from the freestream flow field 700. This may include, for example, inducing the region 733 in the first flow domain 715. Step 1050 may further include maintaining the aero-optical flow region 733 over a range of angular orientations of the device 500 relative to the direction of the freestream flow field 700.

Although this invention has been disclosed in the context of certain embodiments and examples, it will be understood by those skilled in the art that the present invention extends beyond the specifically disclosed embodiments to other alternative embodiments and/or uses of the invention and apparent modifications and equivalents thereof. In addition, while a number of variations of the invention have been shown and described in detail, other modifications, which are within the scope of this invention, will be readily apparent to those of skill in the art based upon this disclosure. It is also contemplated that various combinations or sub-combinations of the specific features and aspects of the embodiments may be made and still fall within the scope of the invention. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above, but should be determined only by a fair reading of the claims that follow.

What is claimed is:

1. An apparatus for controlling fluid flow over a window of a moveable optical instrument housing, the housing comprising a perimeter and at least partially protruding from a vehicle into a freestream flow field, the apparatus comprising:
    an inner perimeter configured to complement the perimeter of the housing;
    an arcuate top surface comprising a curvature and configured to extend into an upstream portion of the freestream flow field; and
    an arcuate outer perimeter coupled to the arcuate top surface,
    wherein the apparatus is configured to couple with the housing and to split the freestream flow field into a first flow field that is at least partially above the apparatus and window and a second flow field that is at least partially under the apparatus and around the housing;
    wherein the first flow field comprises an aero-optical flow region that extends at least partially over the arcuate top surface and continues at least partially over the window, and
    wherein the aero-optical flow region is maintained within a range of angular orientations of the apparatus relative to the freestream flow.

2. The apparatus of claim 1, further comprising:
    an inner portion of the arcuate top surface configured to be substantially flush with an outer portion of the window when the apparatus is coupled with the housing.

3. The apparatus of claim 1, further comprising:
    an inner portion of the arcuate top surface configured to be substantially contiguous with an outer portion of the window when the apparatus is coupled with the housing.

4. The apparatus of claim 3, wherein a slope of the inner portion of the arcuate top surface is configured to substantially match a slope of the outer portion of the window, wherein the outer portion of the window is adjacent to the inner portion of the arcuate top surface.

5. The apparatus of claim 1, further comprising:
    an inner portion of the arcuate top surface,
    wherein the apparatus is configured such that a boundary layer in the first flow field over the inner portion comprises a velocity profile substantially similar to a downstream velocity profile of the boundary layer over an outer portion of the window, and
    wherein the outer portion of the window is adjacent to the inner portion of the arcuate top surface.

6. The apparatus of claim 1, wherein the inner perimeter is substantially impermeable to the freestream flow field, the first flow field and the second flow field.

7. The apparatus of claim 1, wherein the inner perimeter further comprises:
    a seal,
    wherein the seal is substantially impermeable to the freestream flow field, the first flow field and the second flow field.

8. The apparatus of claim 1, wherein the arcuate outer perimeter is rounded.

9. The apparatus of claim 1, wherein the arcuate outer perimeter comprises a radius.

10. The apparatus of claim 1, wherein the arcuate top surface and the outer perimeter form a substantially smooth surface.

11. The apparatus of claim 1, wherein the curvature curves toward the second flow field.

12. The apparatus of claim 1, further comprising:
    a bottom surface, wherein the bottom surface and the arcuate top surface define a thickness therein.

13. The apparatus of claim 12, wherein the thickness is substantially uniform.

14. The apparatus of claim 12, wherein the thickness is substantially nonuniform.

15. The apparatus of claim 1, wherein the inner perimeter, the arcuate top surface, the outer perimeter and the bottom surface form a plurality of cross sections of the apparatus.

16. The apparatus of claim 15, wherein at least one of the cross sections is configured to arcuately extend at least partially around the perimeter of the window, and wherein at least one of the cross sections is configured to extend at least partially toward the freestream flow field.

17. The apparatus of claim 15, wherein at least one of the cross sections is in a plane such that at least part of the freestream flow field in the plane is perpendicular to a line that is tangent to a point on an edge of the cross section.

18. The apparatus of claim 15, wherein at least one of the cross sections is configured to extend at least 180 degrees around the perimeter of the window.

19. The apparatus of claim 1, wherein the optical instrument housing is moveable in at least two dimensions.

20. The apparatus of claim 19, wherein the housing is rotatable about a pitch axis and a yaw axis.

21. The apparatus of claim 20, wherein the aero-optical flow region is maintained for rotations about the pitch and yaw axes of at least +/−135 degrees.

22. The apparatus of claim 1, wherein a Strehl ratio in the aero-optical flow region is at least 0.7 for electromagnetic radiation consisting of a wavelength of about 1 micrometer.

23. The apparatus of claim 1, wherein the optical instrument housing is substantially spherical and the window is substantially planar.

24. The apparatus of claim 23, wherein the optical instrument housing comprises a turret housing on the vehicle, wherein the vehicle is an aircraft.

25. The apparatus of claim 24, wherein the apparatus is coupled to the turret housing.

26. A method for controlling fluid flow over the window of an optical instrument housing on a vehicle in a freestream flow field, the method comprising:
splitting an upstream portion of the freestream flow field into a first flow field comprising an aero-optical flow region and a second flow field using an apparatus comprising:
an inner perimeter configured to complement a perimeter of the housing,
an arcuate top surface comprising a curvature and configured to extend into the upstream portion of the freestream flow field, and
an arcuate outer perimeter coupled to the arcuate top surface,
wherein the apparatus is configured to couple with the housing;
wherein the aero-optical flow region extends at least partially over the top surface and continues at least partially over the window, and
wherein the second flow field is at least partially under the apparatus and around the housing,
wherein the aero-optical flow region is maintained over a range of angular orientations of the apparatus relative to the freestream flow.

27. The method of claim 26, further comprising:
coupling the apparatus to the housing.

28. The method of claim 27, further comprising:
forming a substantially contiguous surface with an inner portion of the top surface and the perimeter of the housing.

29. The method of claim 27, further comprising:
matching the slope of an outer portion of the housing with the inner portion of the top surface, wherein the outer portion of the housing is adjacent to the inner portion of the top surface.

30. A system for controlling fluid flow over a window of a moveable optical instrument housing that protrudes from a vehicle into a freestream flow field, the system comprising:
a housing defining an axis; and
an arcuate lip comprising a curved top surface and outwardly extending away from the axis,
wherein the lip is configured to split the freestream flow field into a first flow field above the lip and window and a second flow field under the lip and around the housing,
wherein the first flow field comprises an aero-optical flow region that extends at least partially over the top surface of the lip and continues at least partially over the window, and
wherein the aero-optical flow region is maintained over a range of angular orientations of the axis relative to the freestream flow.

* * * * *